Figure 1:
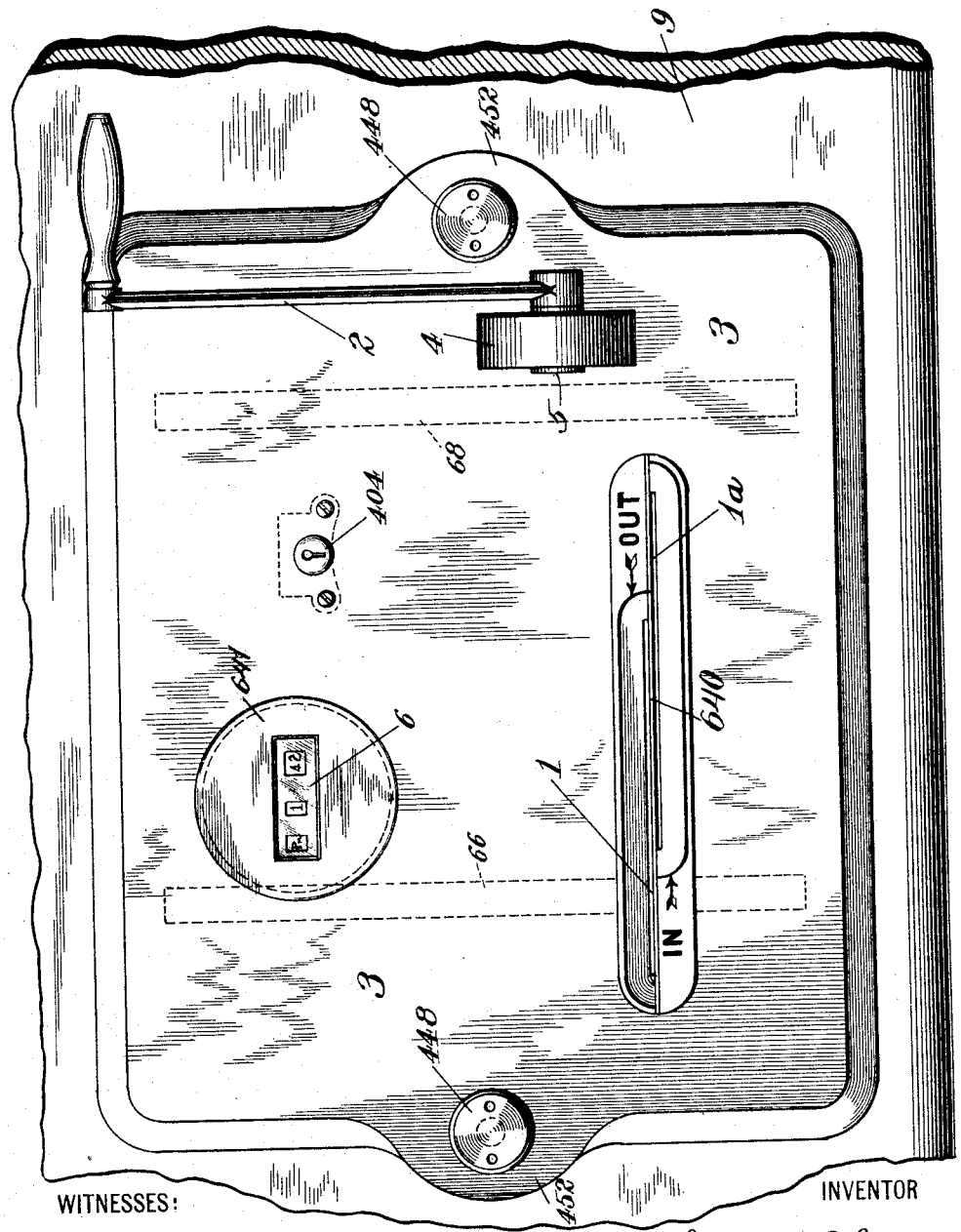

J. W. BRYCE.
TIME RECORDER.
APPLICATION FILED MAY 19, 1909.

1,186,541.

Patented June 13, 1916.
22 SHEETS—SHEET 3.

Fig. 3.

J. W. BRYCE.
TIME RECORDER.
APPLICATION FILED MAY 19, 1909.

1,186,541.

Patented June 13, 1916.
22 SHEETS—SHEET 5.

WITNESSES:

INVENTOR
James W. Bryce
BY
Kenyon & Kenyon
ATTORNEYS

J. W. BRYCE.
TIME RECORDER.
APPLICATION FILED MAY 19, 1909.

1,186,541.

Patented June 13, 1916.
22 SHEETS—SHEET 6.

J. W. BRYCE.
TIME RECORDER.
APPLICATION FILED MAY 19, 1909.
1,186,541.
Patented June 13, 1916.
22 SHEETS—SHEET 12.
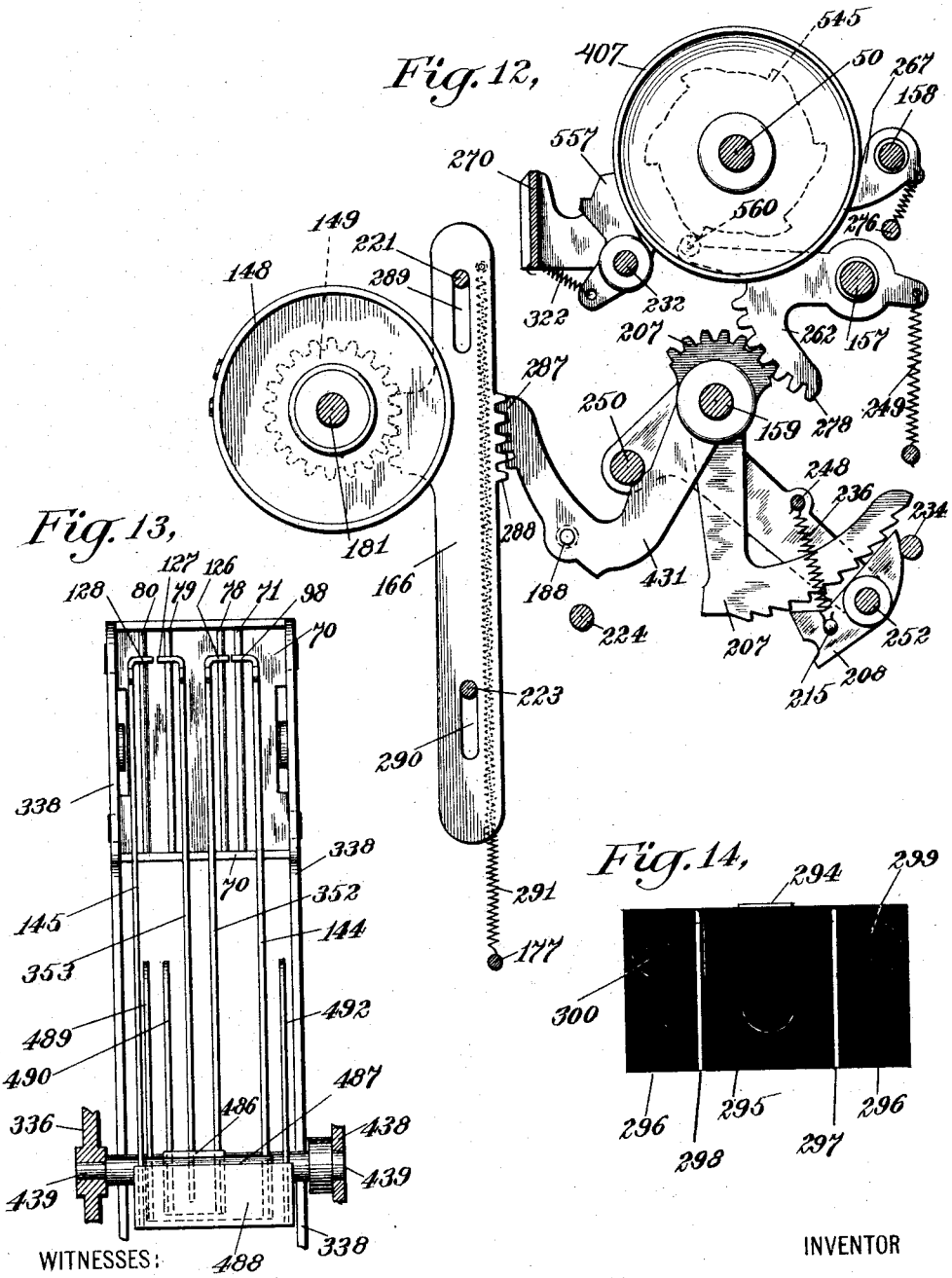

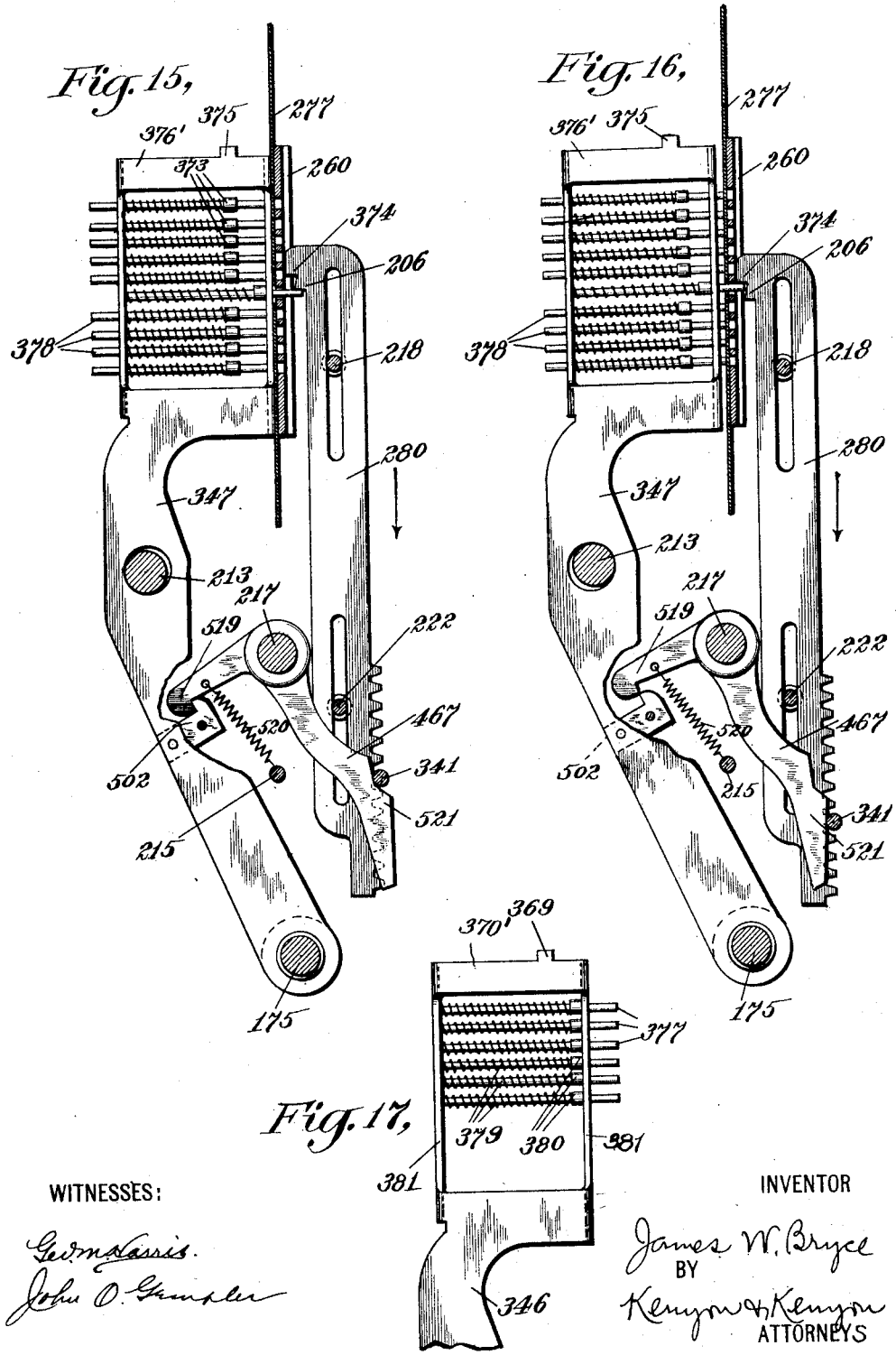

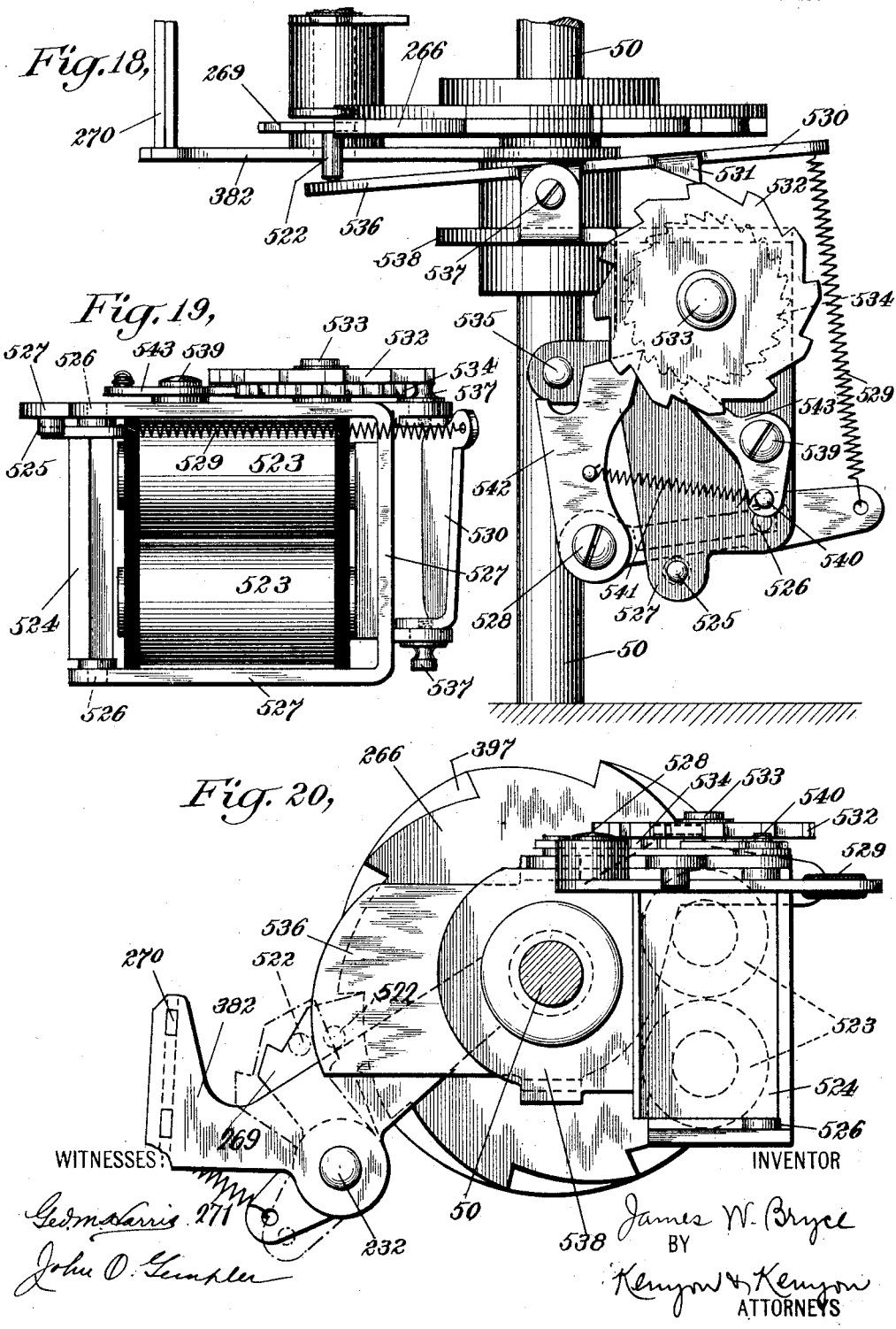

J. W. BRYCE.
TIME RECORDER.
APPLICATION FILED MAY 19, 1909.
1,186,541.
Patented June 13, 1916.
22 SHEETS—SHEET 15.
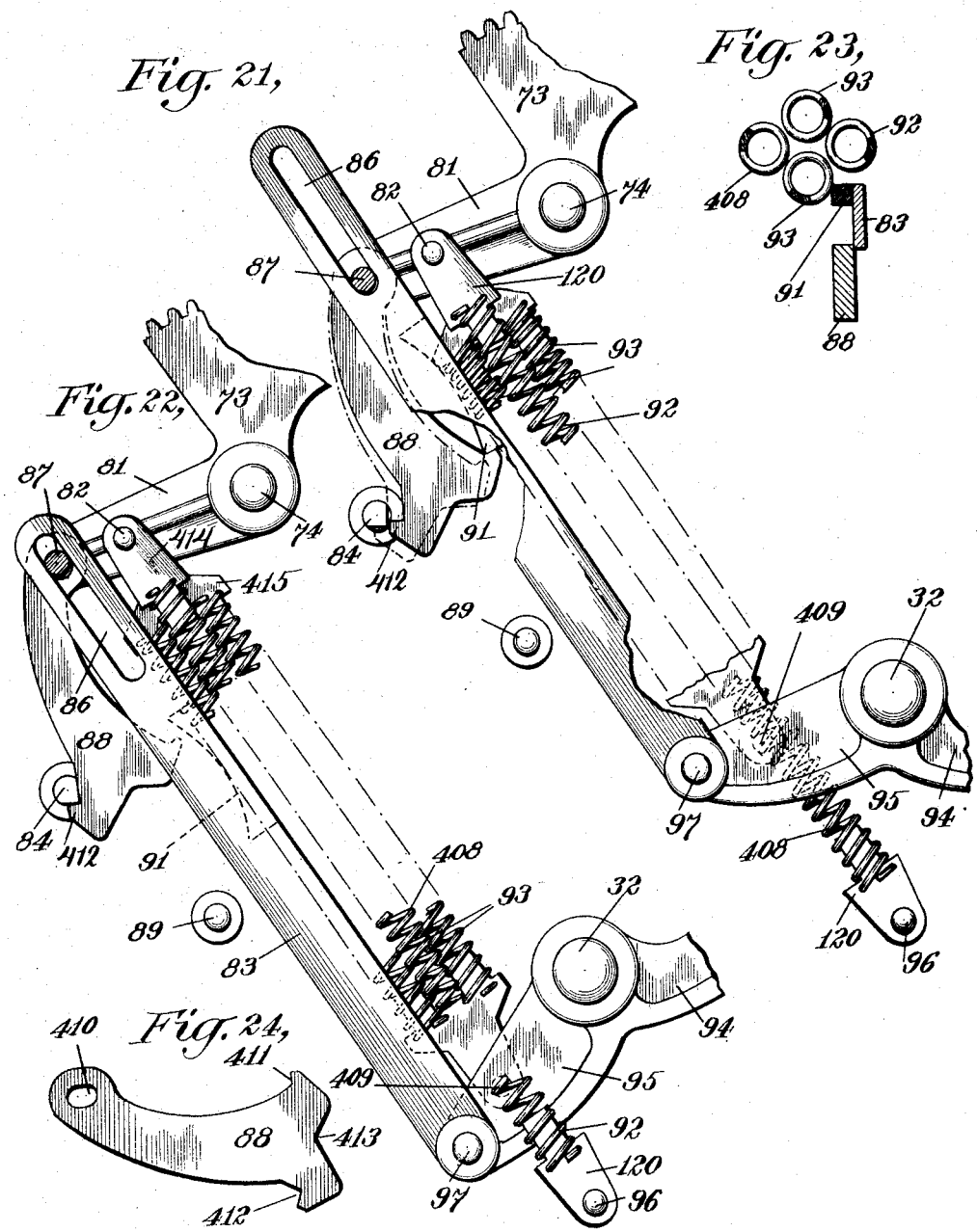

J. W. BRYCE.
TIME RECORDER.
APPLICATION FILED MAY 19, 1909.
1,186,541.
Patented June 13, 1916.
22 SHEETS—SHEET 16.
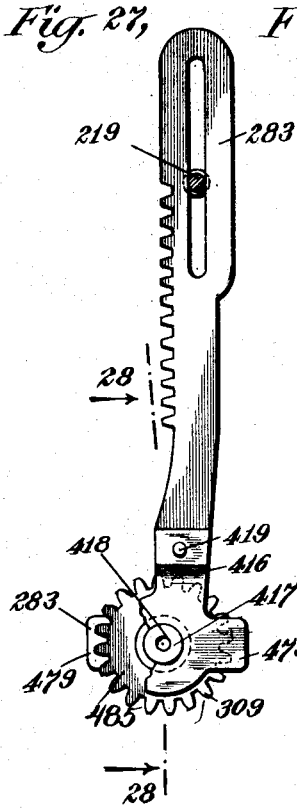
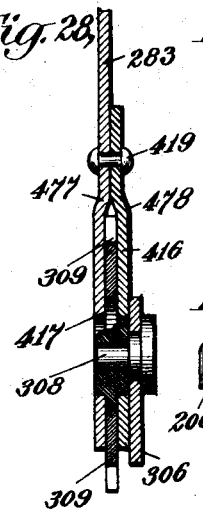
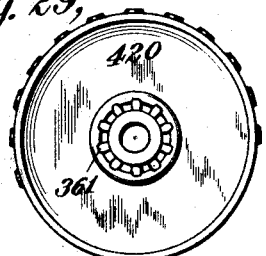
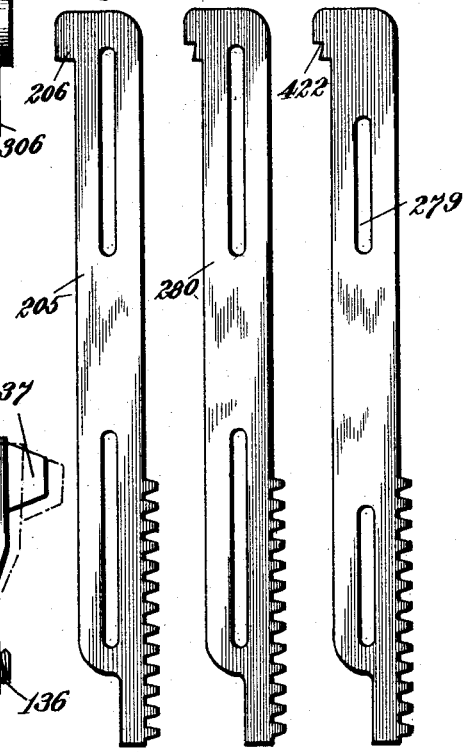
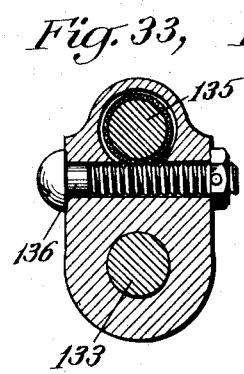
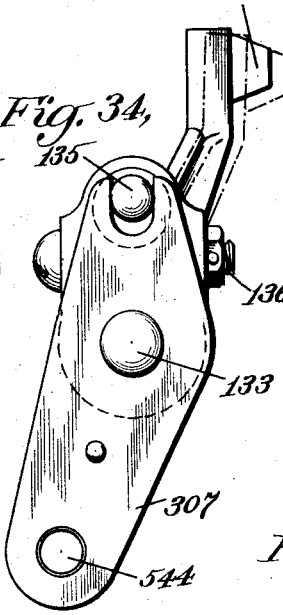
WITNESSES:
INVENTOR
James W. Bryce
BY
Kenyon & Kenyon
ATTORNEYS

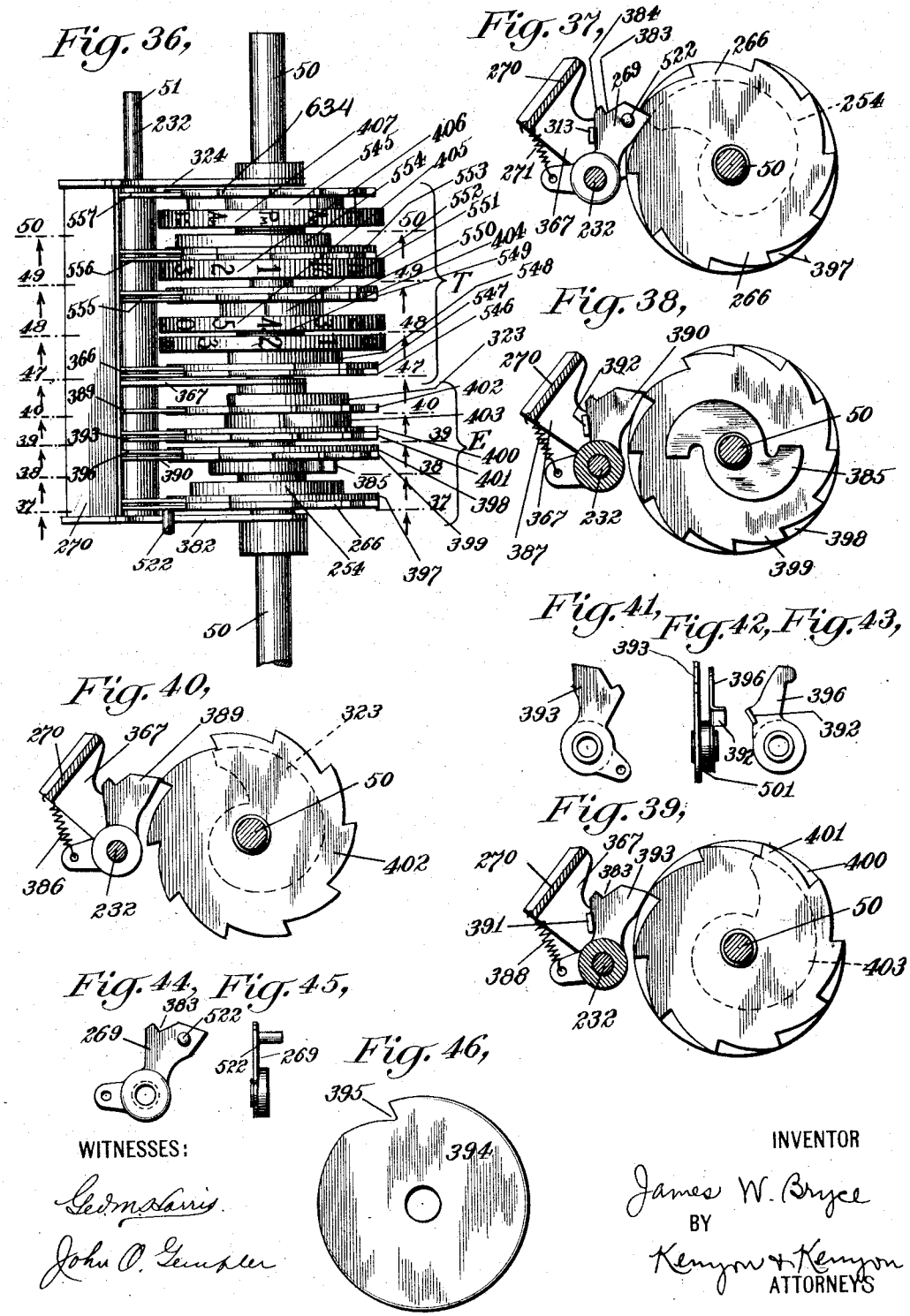

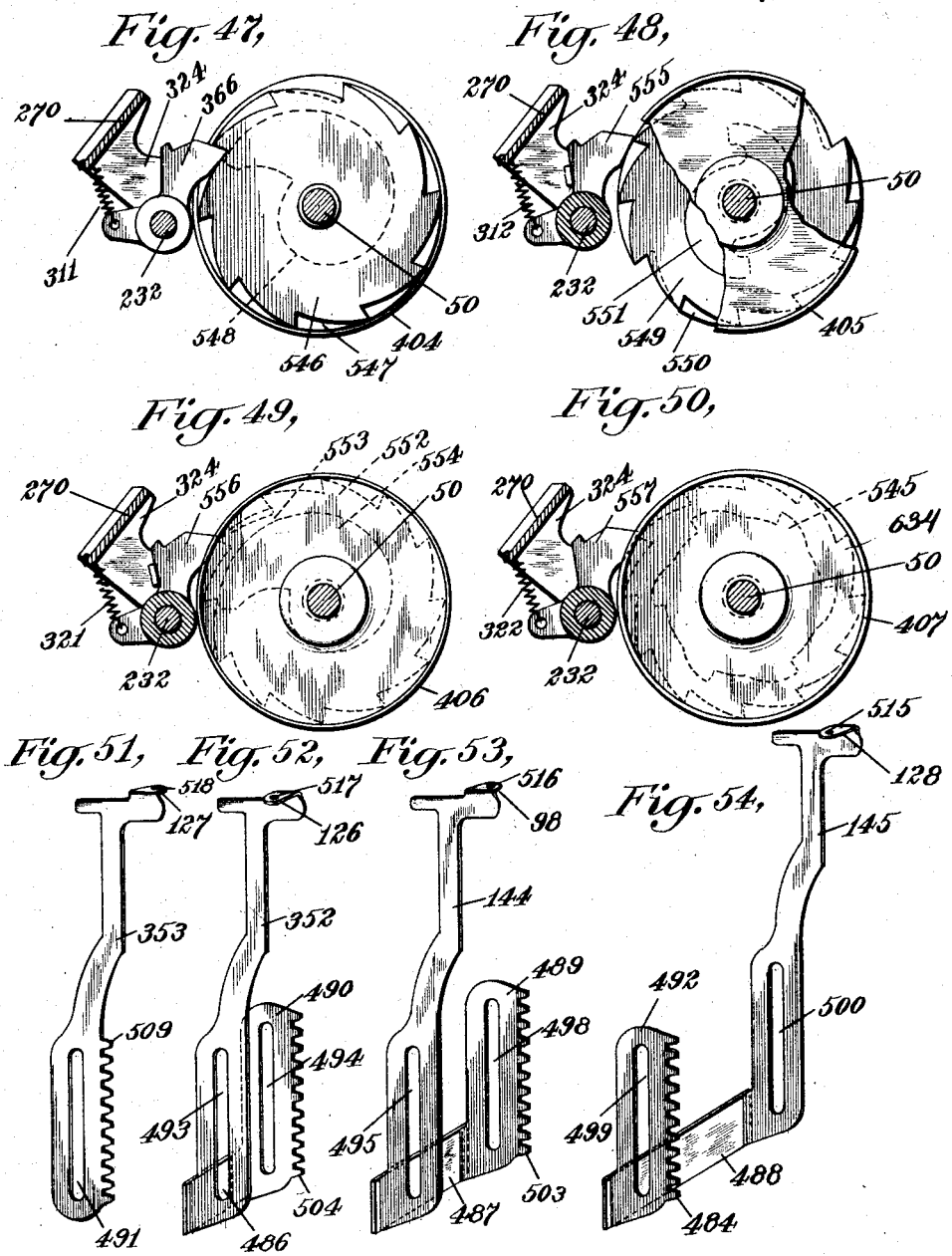

J. W. BRYCE.
TIME RECORDER.
APPLICATION FILED MAY 19, 1909.
1,186,541.
Patented June 13, 1916.
22 SHEETS—SHEET 19.
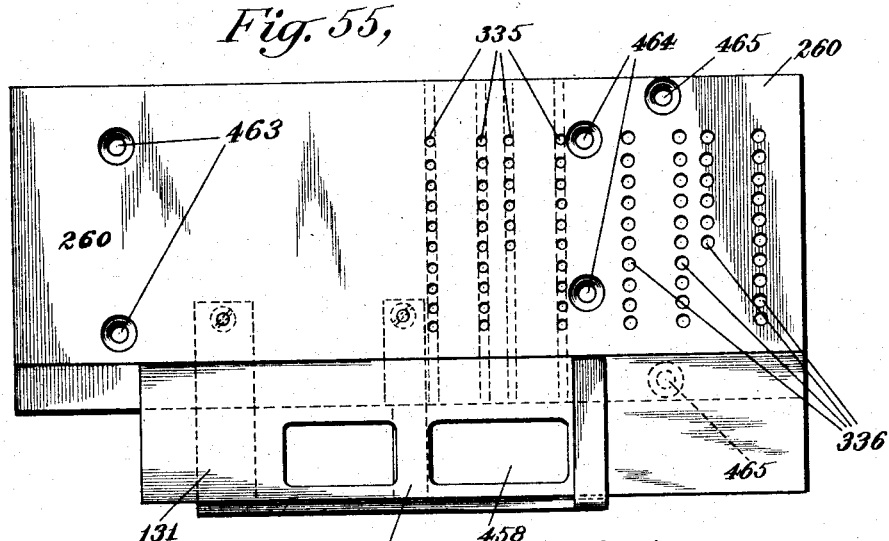
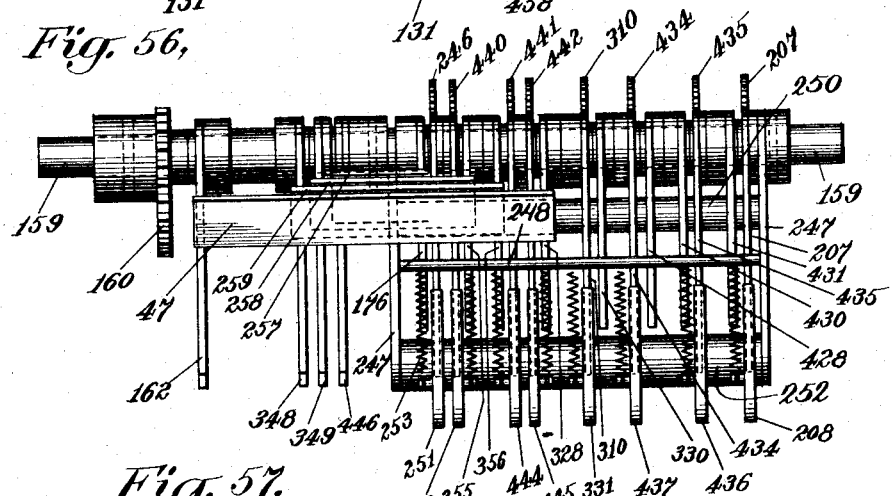
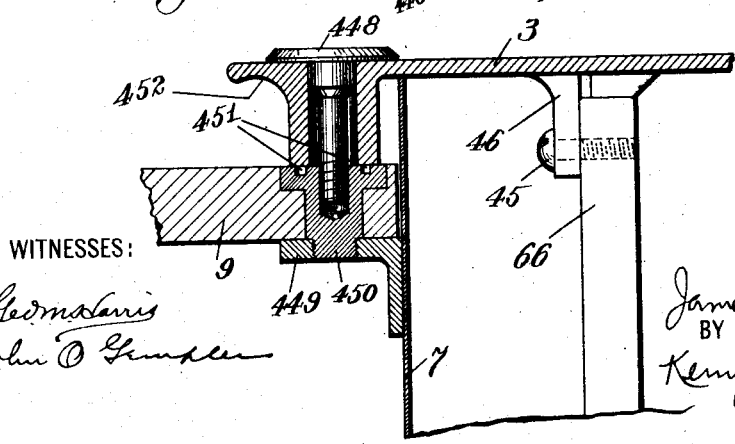
WITNESSES:
INVENTOR
James W. Bryce
BY
Kenyon & Kenyon
ATTORNEYS

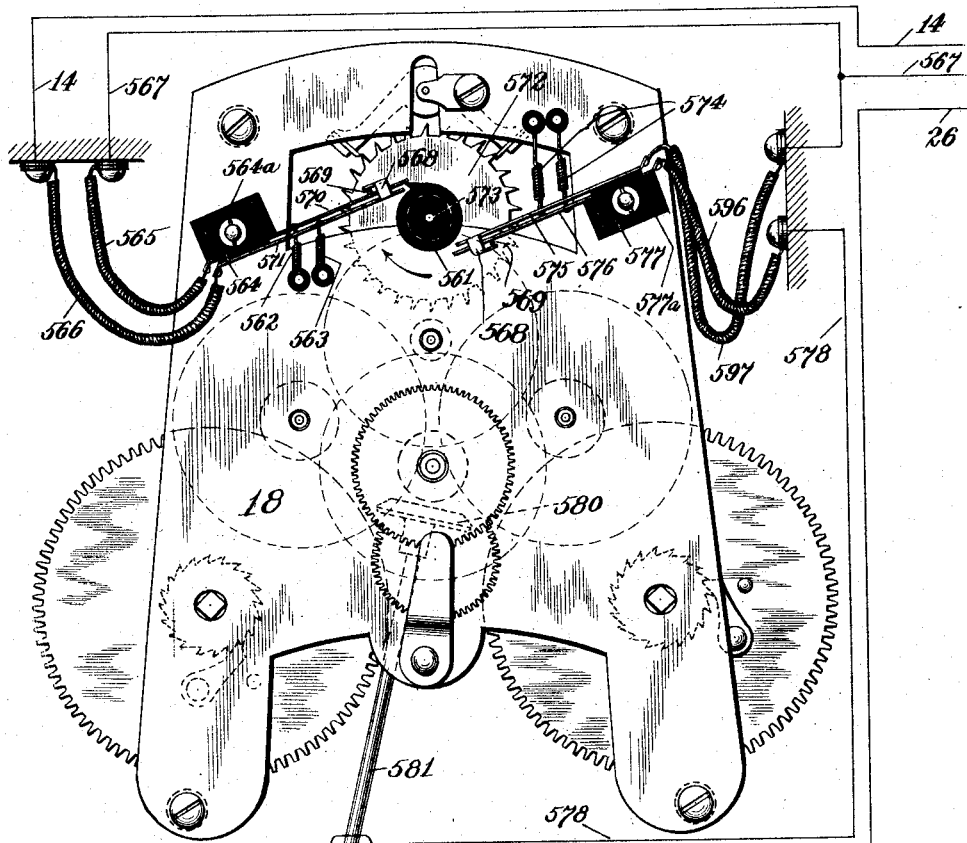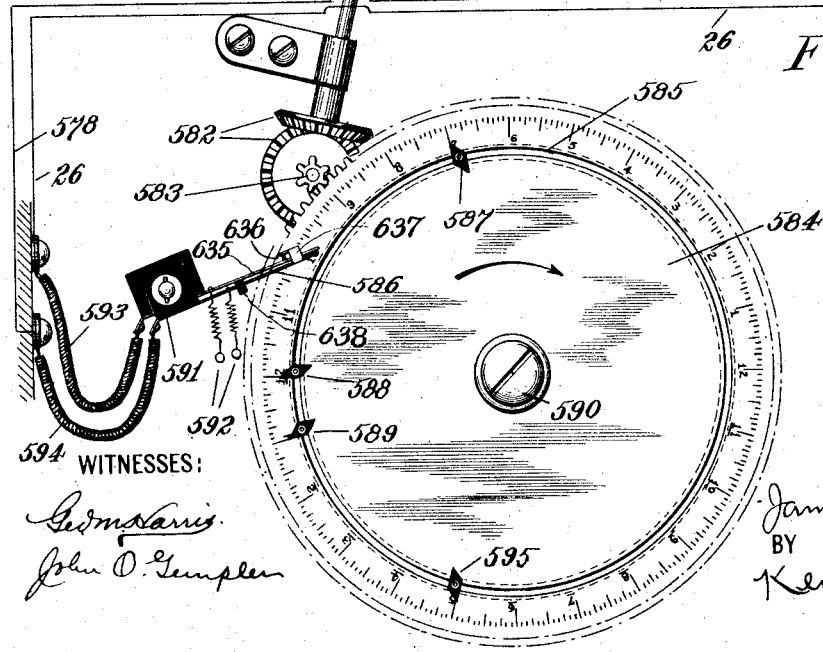
Fig. 58.

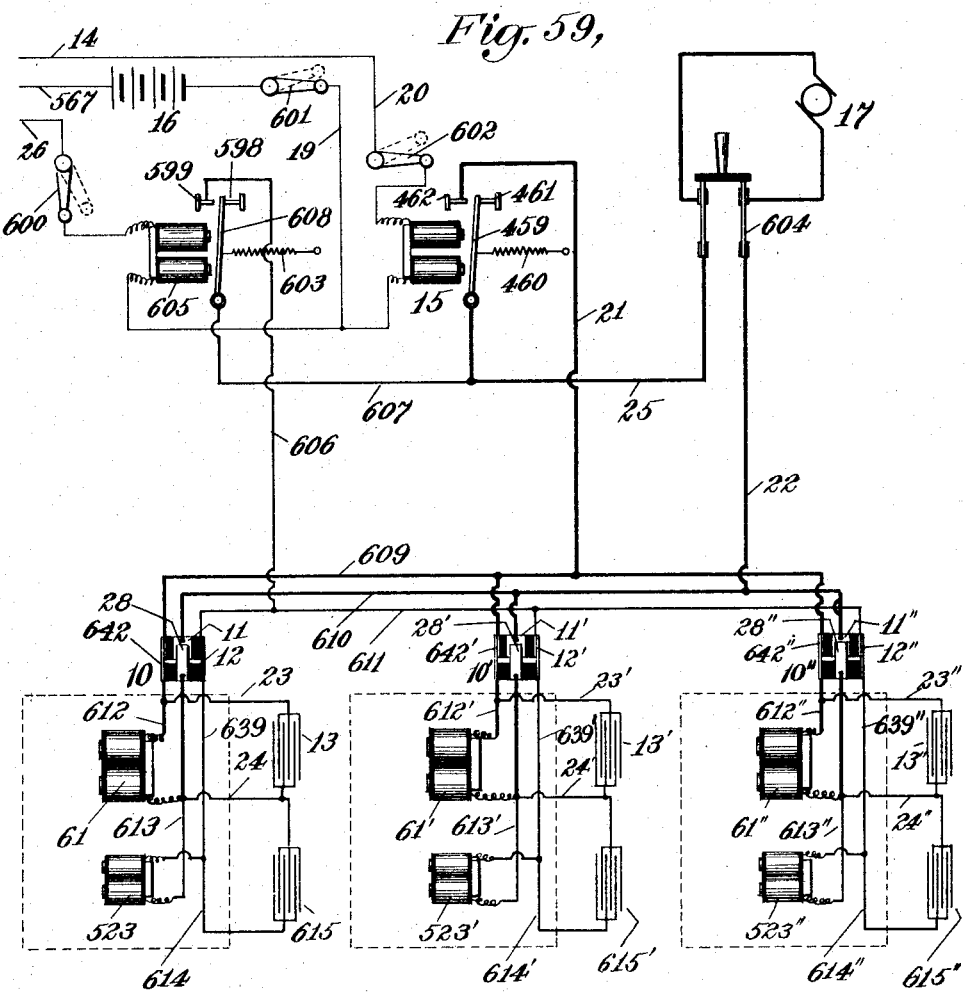

J. W. BRYCE.
TIME RECORDER.
APPLICATION FILED MAY 19, 1909.

1,186,541.

Patented June 13, 1916.
22 SHEETS—SHEET 22.

UNITED STATES PATENT OFFICE.

JAMES W. BRYCE, OF BROOKLYN, NEW YORK, ASSIGNOR TO INTERNATIONAL TIME RECORDING COMPANY OF NEW YORK, OF ENDICOTT, NEW YORK, A CORPORATION OF NEW YORK.

TIME-RECORDER.

1,186,541.      Specification of Letters Patent.     Patented June 13, 1916.

Application filed May 19, 1909. Serial No. 497,005.

*To all whom it may concern:*

Be it known that I, JAMES W. BRYCE, a citizen of the United States, and a resident of Brooklyn, in the county of Kings and State of New York, have invented certain new and useful Improvements in Time-Recorders, of which the following is a specification.

My invention relates to time indicating machines and to time recorders.

It is of especial value in machines for indicating elapsed time between two operations, although in some of its features it is not limited to use in such a machine.

It has for its object to increase the indicating capacity of such machines, especially that of elapsed time indications, so that a continuous and progressive series of such indications may be carried on for relatively long periods of time; also to include in such a series of indications only certain intervals of the period of time covered by such series, such as working hours, and to exclude other intervals of time during that period; also to secure such increased capacity and yet obtain at any time without computation a record of such time indication or elapsed time indication; also to obtain such records upon a removable card or equivalent device; also to give a time-of-day indication at each operation of the machine; also to employ but a single source of power for obtaining both the time-of-day indications and the other time indications; also to provide means for operating the elapsed time indicating devices at each operation of the machine and yet prevent a record being made from the elapsed time indicating mechanism except at a second or later operation of the machine by the same operator; to provide new and improved means for arranging the punch selecting and operating devices, the elapsed time recording wheels, the time-of-day recording wheels and the card slot relatively to one another so as to permit all records to be made upon one side of the card; also to provide automatic means for printing A. M. and P. M. upon the card at the appropriate times and generally to simplify and improve machines of the general character above described and to render them more durable and more certain in operation.

My invention consists in the novel devices and combinations shown and described.

In the drawings accompanying this specification and forming a part hereof, I have shown my invention in its preferred form and as embodied in a machine which indicates the time-of-day of each operation of the machine and upon a second or later operation of the machine by a workman the elapsed time between the earlier operation and the later operation and which does such indicating by recording upon a card either by printing figures or by punching holes. My invention, however, at least in some of its features, is not limited to a machine which indicates both time-of-day and elapsed time or which indicates by printing or punching.

I will now proceed to describe the preferred form of my invention as disclosed in the particular machine shown in the drawings.

Figure 2:
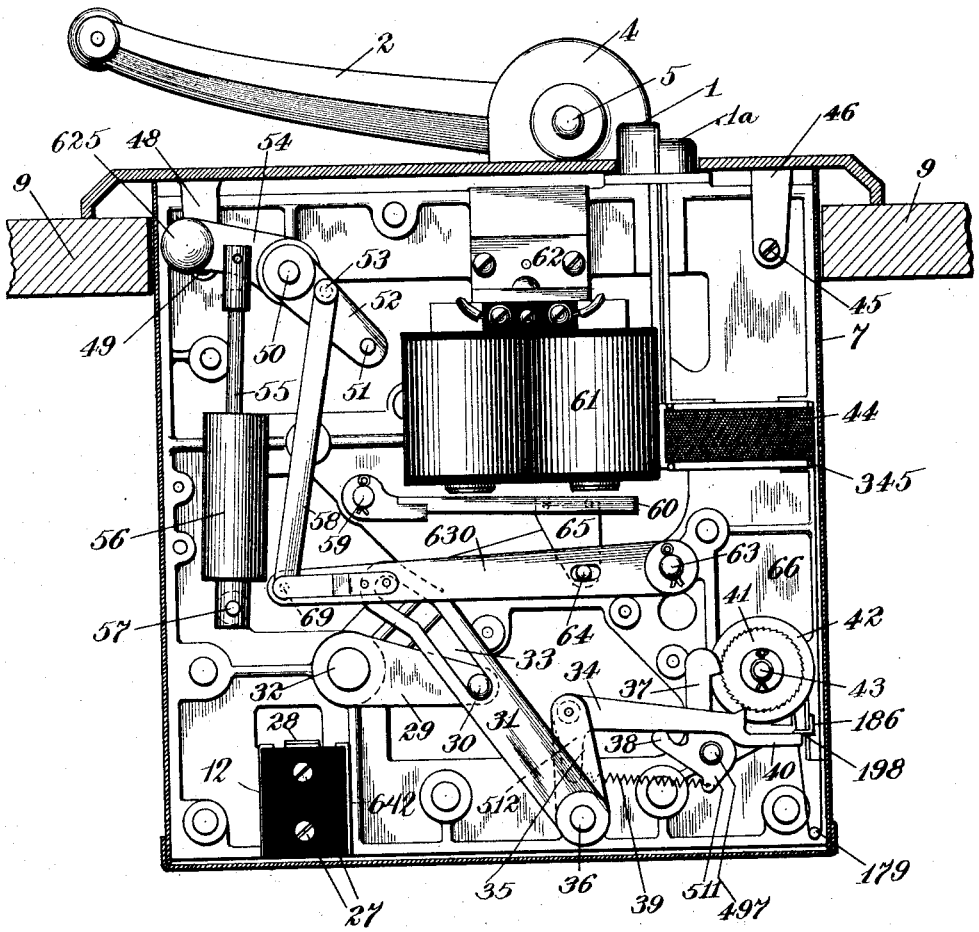
Figure 4:
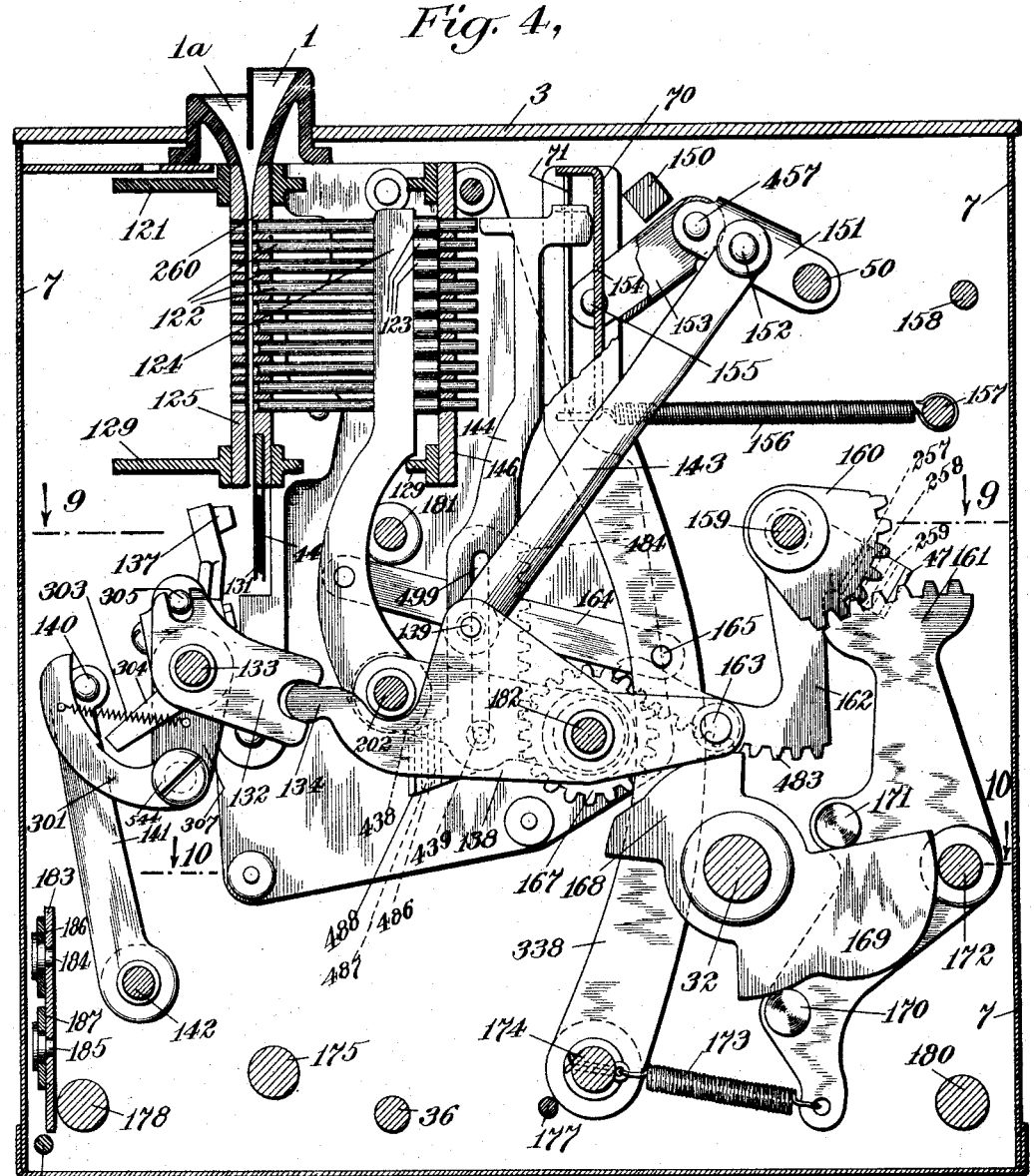
Figure 5:
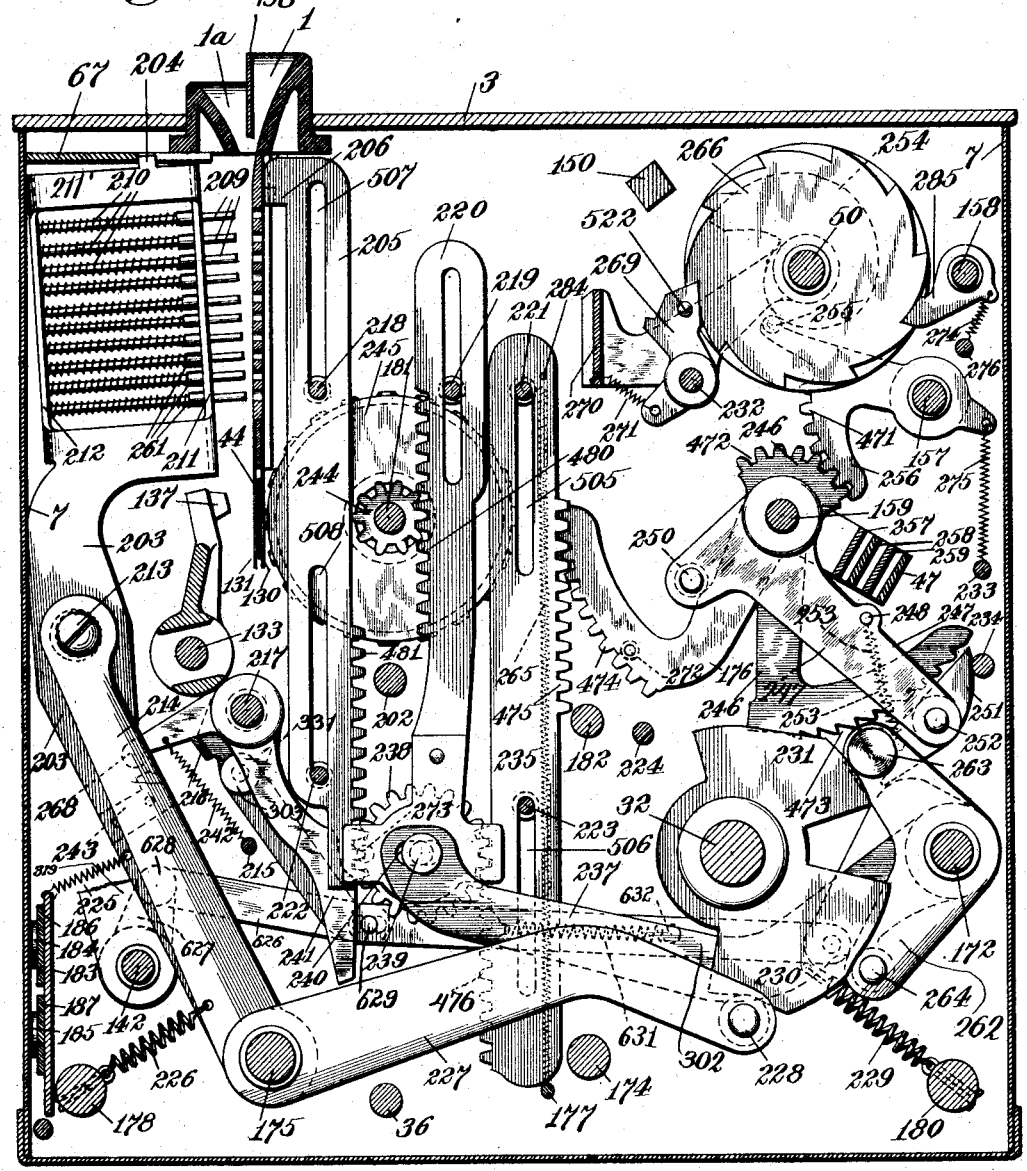
Figure 6:
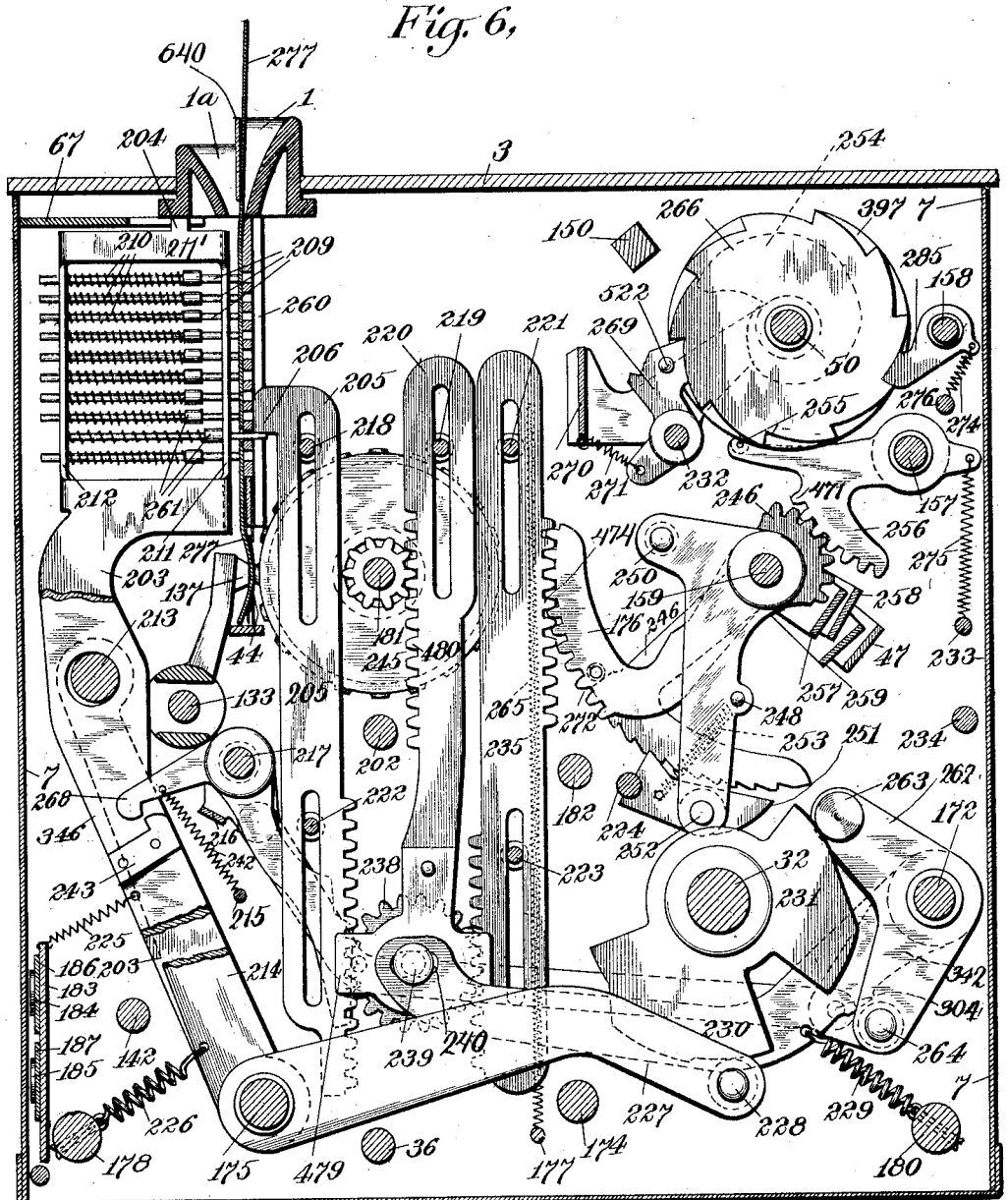
Figure 7:
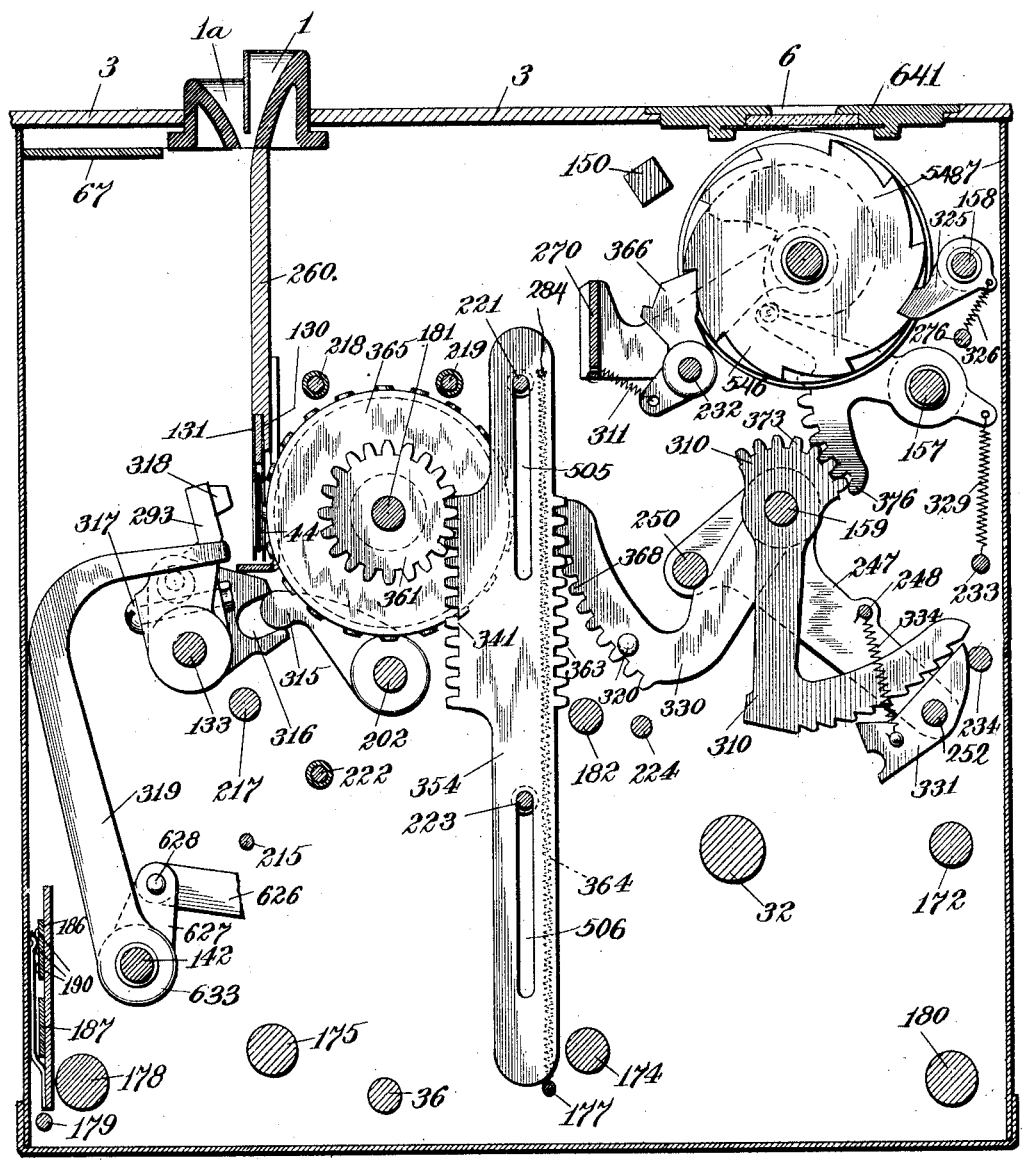
Figure 8:
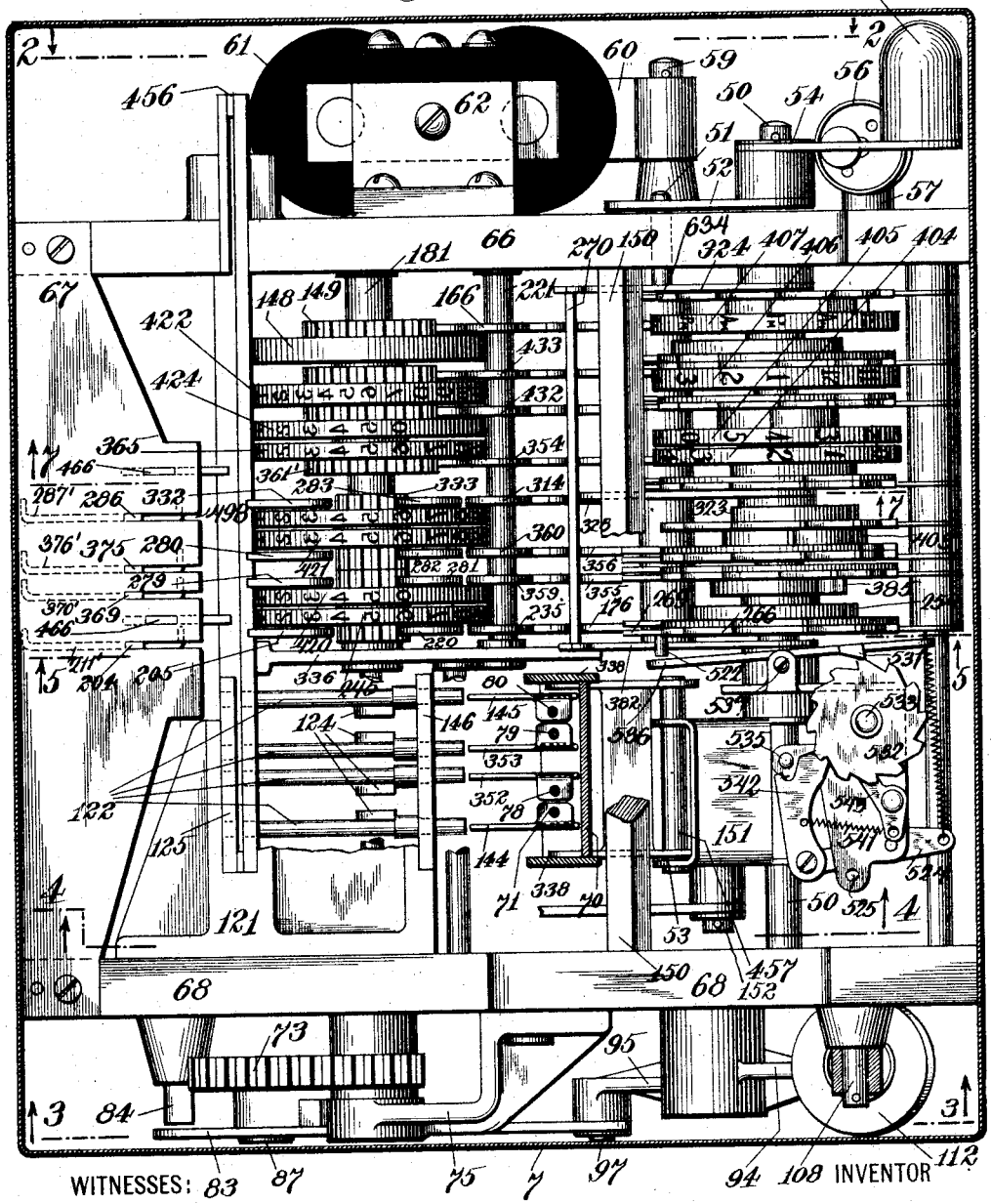
Figure 9:
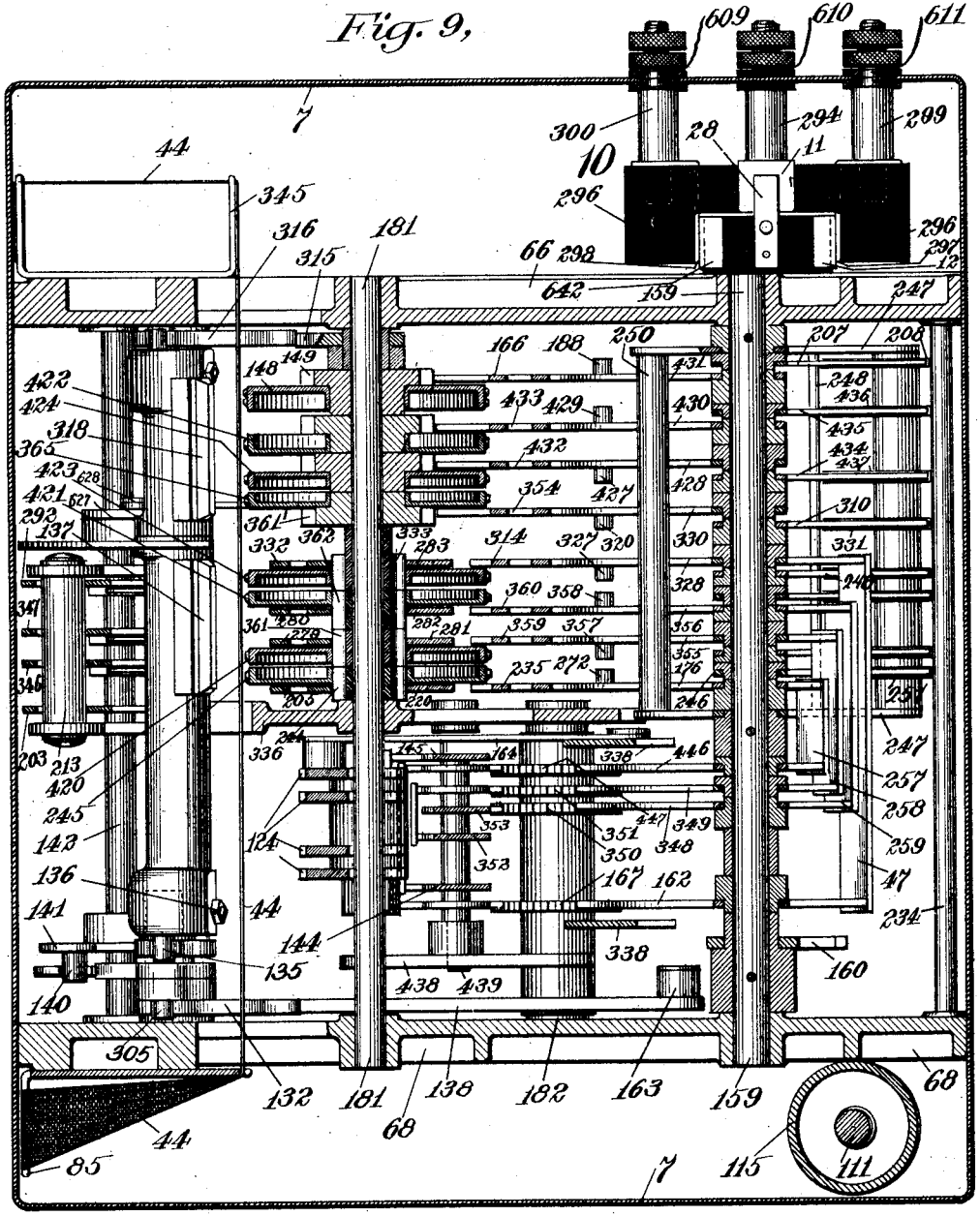
Figure 10:
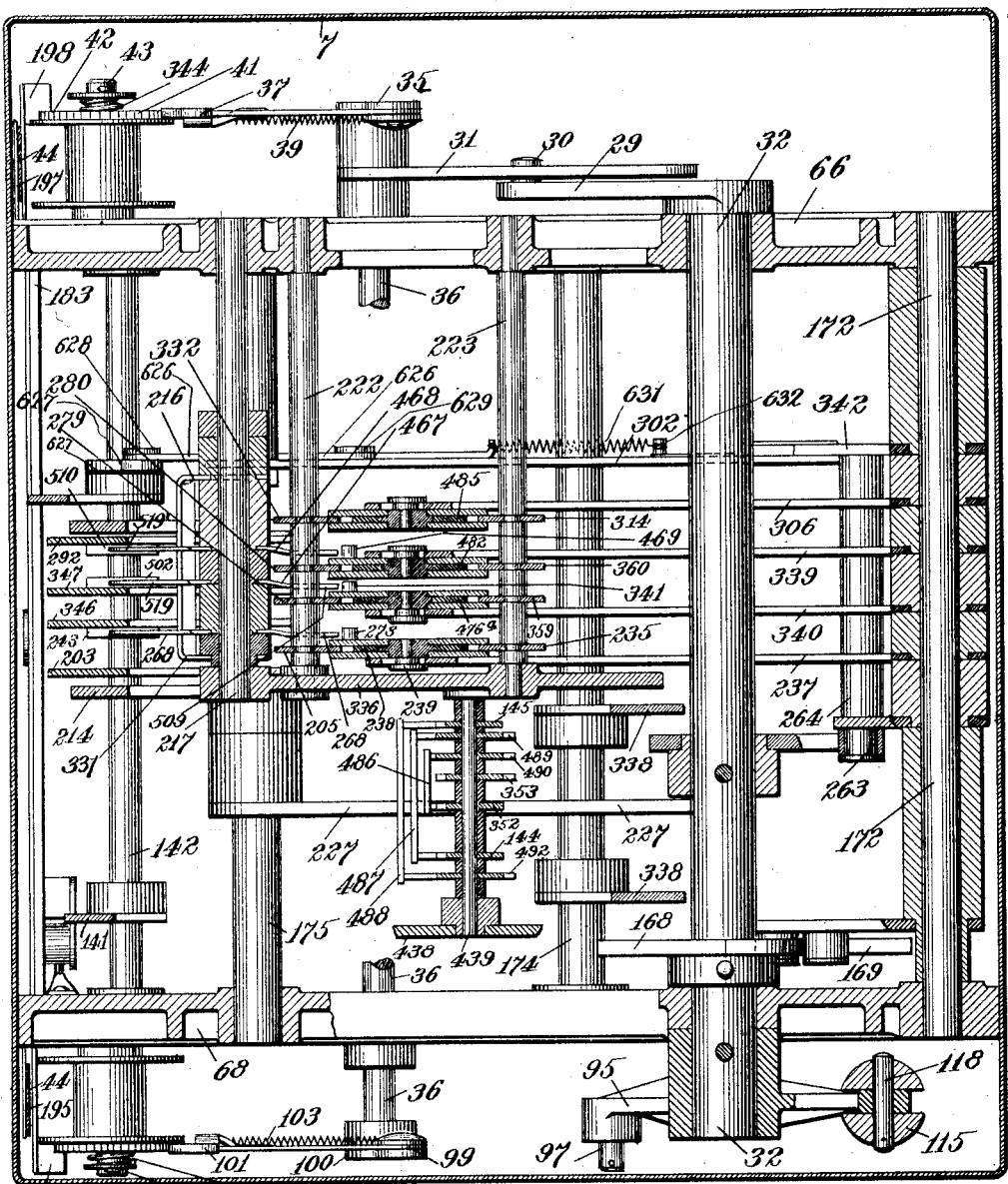
Figure 11:
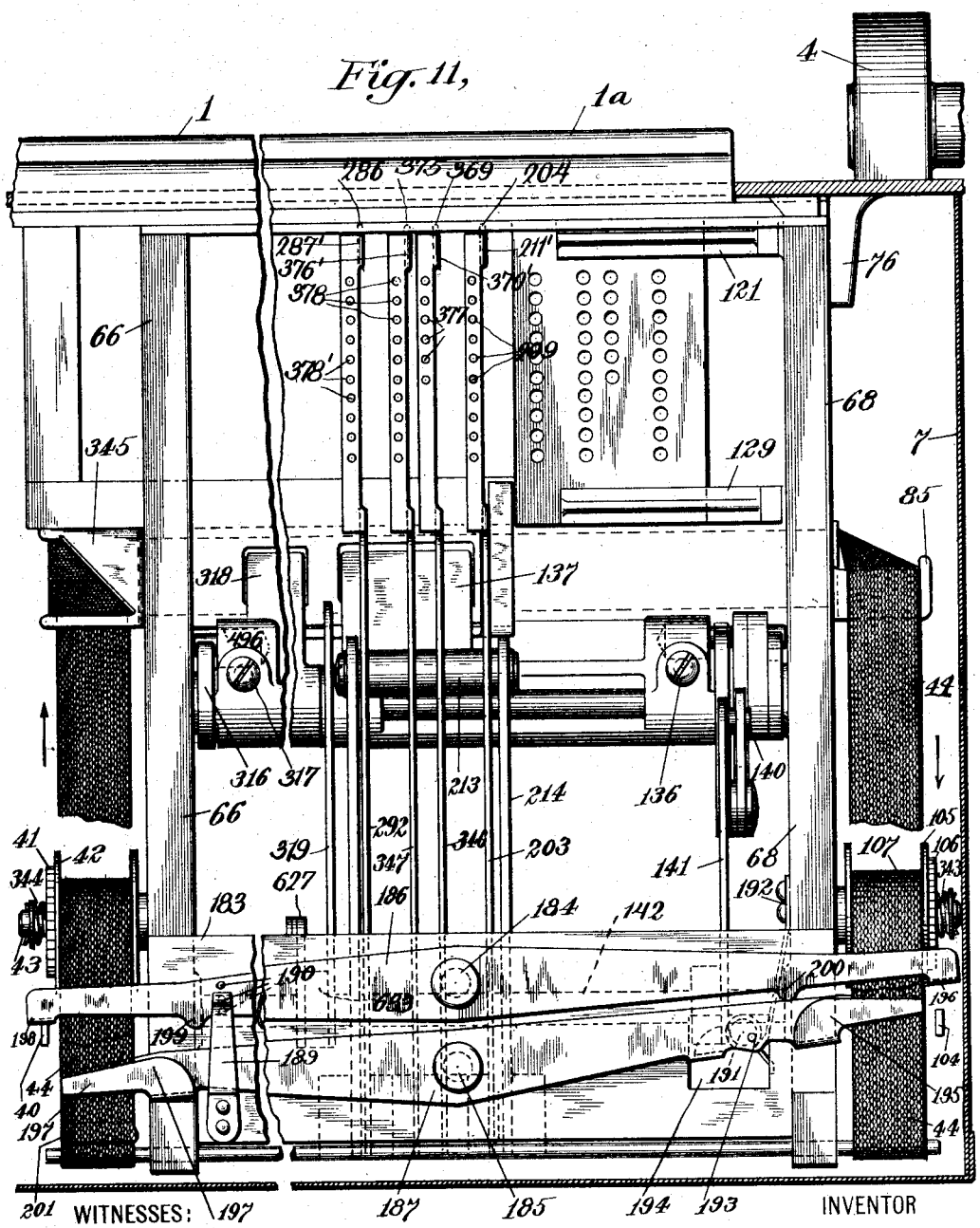

Figure 1 is a top view of the machine showing it set in a table or shelf or desktop. Fig. 2 is a vertical longitudinal section taken just inside the case on the line 2—2 of Fig. 8. Fig. 3 is a vertical longitudinal section taken just inside of the opposite side of the case on the line 3—3 of Fig. 8. Fig. 4 is a vertical longitudinal section taken on the line 4—4 of Fig. 8 and shows the punch mechanism. Fig. 5 is a vertical longitudinal section taken on the line 5—5 of Fig. 8 and shows the elapsed time indicating mechanism of the minute column. Fig. 6 is the same section as that of Fig. 5 with the parts in the recording position. Fig. 7 is a vertical longitudinal section taken on the line 7—7 of Fig. 8 and shows the time-of-day mechanism of the minute column. Fig. 8 is a plan of the mechanism with the cover plate removed. Fig. 9 is a horizontal section on the line 9—9 of Fig. 4 and shows all of the type wheels. Fig. 10 is a horizontal section on the line 10—10 of Fig. 4 and shows the differential gears. Fig. 11 is a front view of the mechanism of the machine with the case in section and with parts broken away so as to permit other parts to be shown more clearly. Fig. 12 is a detailed sectional view showing the train of mechanism of the A. M. and P. M. printing wheel. Fig. 13 is a detailed face view of the punch selectors, showing in detail the selector cross-overs. Fig. 14 is a detailed face view of the insulating receptacle permanently fastened inside of the case of the machine. Figs. 15 and 16 are detailed views of one of the pin boxes showing a pin in set position and illustrating in Fig. 15 the control of the pin over the subtracting rack in the ordinary subtracting operation and in Fig. 16 in the borrowing operation. Fig. 17 is a detail of the special pin box of the tens of minute column. Fig. 18 is an enlarged detailed plan view of the magnetic cut-out mechanism. Fig. 19 is a side view of the same and Fig. 20 an end view of the same. Figs. 21 and 22 are details of the flexible impulse mechanism and Fig. 23 is a section of the springs taken on the line 23—23 of Fig. 3 and Figs. 24, 25 and 26 are details of the impulse mechanism. Fig. 27 is a detail of one of the differential gears and its rack and Fig. 28 is a section taken on the line 28—28 of Fig. 27. Fig. 29 is a detail view of the tens of minutes type wheels, either time-of-day or elapsed time. Figs. 30, 31 and 32 are details of the minute, hour and tens of minutes racks respectively. Fig. 33 is a detailed sectional view of the adjusting devices for the printing pad of the elapsed time type wheel and Fig. 34 is an end view of the same. Fig. 35 is a detailed side view of the worm and screw of Figs. 33 and 34. Fig. 36 is a plan view of the indicating wheels, the time-of-day timing cams and the elapsed time timing cams, the parts being shown with their shaft just as if removed from the machine. The various cams are shown in this figure as in the same relative positions shown in the detailed sections of the same respectively shown in the drawings. Figs. 37 to 40 are sections taken on the lines 37—37, 38—38, 39—39 and 40—40 of Fig. 36, showing respectively the minute, tens of minutes, hours and tens of hours cams and connecting parts of the elapsed time set of timing cams. Fig. 41 is a detail of the pawl for turning the hour ratchet. Fig. 42 is a side view of Fig. 41 showing the pawl secured to the same boss that carries the wiper resting on the tens of minute disk. Fig. 43 is a detail of the wiper of the tens of minutes column. Fig. 44 is a detailed side view and Fig. 45 an edge view of the minute pawl. Fig. 46 is a detailed side view of one of the wiper disks. Figs. 47, 48, 49 and 50 are sections taken on the lines 47—47, 48—48, 49—49 and 50—50 respectively of Fig. 36, showing the time-of-day minute, tens of minutes and hour cams and the A. M. and P. M. wheel and cam and their respective connecting parts. Figs. 51, 52, 53 and 54 are perspective views of the hour, tens of minutes, minutes and tens of hour punch selectors respectively. Fig. 55 is a face view of the die plate and the ribbon guide plates as they appear when removed from the machine. Fig. 56 is a side view of the ratchets and sector gears by which the type wheels are moved to position and also of the pawls engaging the various sectors and of the cross-overs. Fig. 57 is a detailed section showing the means for fastening the machine to a table or desk-top or shelf. Fig. 58 is a semi-diagrammatic view showing the master-clock mechanism and means by which the cut-out mechanism is controlled. Fig. 59 is a diagram of circuits and relays for controlling several elapsed time machines. Figs. 60, 61 and 62 are views of tickets or cards for use in the machine described, Fig. 60 being a face view of the card used as an example in the accompanying description and Fig. 62 being a view of a part of the back of the card. Fig. 61 is a card containing a record which was started and finished during working hours and where the cut-out accordingly did not come into operation.

In order that the construction and operation of my improved machine, shown in the drawings, may be more easily understood, I will first describe, in a general way, the manner of its operation by an operator and the results accomplished by such operation and how they are obtained and later I will describe in detail the specific mechanism by which the results are obtained.

When an operator begins his day's work or begins a job at any time, he inserts his card 624 in the right-hand slot 1ª marked "In" in Fig. 1. The card slot is composed of two parts, a right-hand or "in" one and a left-hand or "out" one, as clearly shown in Fig. 1, the two slots overlapping each other and being slightly out of line. Fig. 1 shows a plate 640 between the two slots. The two slots are made to slightly overlap, so that the card in the "in" slot will be slightly to the right of the position of the card when in the "out" slot. This in the "in" operation will bring the "in" space 620 on the card (Fig. 60) opposite the A. M. and P. M. type wheel 148 and the time-of-day hour, tens of minutes and minutes type wheels 422, 424 and 365 (Fig. 8) and will bring the right-hand end of the card opposite the punches 122 so that the time holes 619, 618, 617 and 616 (representing the tens of hours, hours, tens of minutes and minutes respectively of the time of the first operation) will appear at the right of the card, as in Fig. 60. On the second or "out" operation the placing of the card in the "out" slot will bring the space at the top of the card marked "Out" in Fig. 60 opposite to the time-of-day wheels 148, 422, 424 and 365, will bring the time holes 619—616 opposite the pin boxes and subtractor racks and will bring the space 622 headed "Working time" in Fig. 60 opposite the tens of hours, hours, tens of minutes and minutes elapsed time type wheels 423, 421, 420 and 245 (Figs. 9 and 8). The "out" and "in" slots are so slightly separated that the card in either slot will lie close to the various type wheels and printing and punching devices. In inserting the card into the slot, the workman inserts it with the spaces 620, 621, 622 at the bottom and facing the type wheels, or in other words, with the back of the card with the words "Working time, this side out" facing him and with the part of the card with the above quoted words at the top. This will bring the spaces 620, 621, 622 at the bottom and facing the type wheels. The workman then pulls handle 2, mounted on shaft 5 in casing 4, forward the full extent of its movement and lets it go, the handle being automatically returned to its original position. This moves the main cam shaft 32 of the machine and operates the various parts of the mechanism. It causes certain punches representing the time of the operation to be selected and to be later operated to punch holes in the card, 619—616, which by their location upon the card represent the time of such operation. It also causes the time-of-day type wheels to print in the "in" space 620 at the upper left-hand corner of the card, as viewed in Fig. 60 the time of said operation. In the example shown in Fig. 60, this time is "AM 9 48." This movement of handle 2 also has fed the ink ribbon.

When the workman finishes his day's work or has ended his job at any time, he inserts his card into the left-hand slot 1 and again pulls handle 2 forward. This causes the time-of-day wheels to print the time of the operation in the "out" space 621 shown on Fig. 60. The time there given for the "out" operation is "PM 1 42." The movement of handle 2 has also caused the elapsed time type wheels 423, 421, 420 and 245, which stand normally at zero, to be moved in two ways. The movement in one way, in the adding direction, brings them into a position to correspond with the position or condition at that instant of corresponding elapsed time timing cams, 323 the tens of hours cam, 403 the hours, 385 the tens of minutes and 254 the minutes. These cams are clock controlled but are not continuously driven, their condition at any time representing, not the true time at that instant, but the total in tens of hours, hours, tens of minutes and minutes of the working hours up to that time. Certain connecting means, actuated by handle 2, move the elapsed time type wheels to correspond to this time condition of the timing cams. The movement of the elapsed time type wheels in the other direction, the subtracting direction, is controlled by and is in accordance with the position or condition of the elapsed time timing cams as it existed at the time of the first operation of the machine by the same workman, or in other words, the condition of such cams at the first operation is subtracted from their condition at the time of the second operation, giving the elapsed time between the two. This subtracting operation is accomplished by means of subtracting racks, which are released by handle 2, and which fall by their own weight. In the second operation, their falling movement is limited by the position of pins which are brought by the action of handle 2 against the card in vertical alinement with the respective holes punched in the card 619—616. The pin in each series of pins corresponding with each of these holes passes through said hole in the card and projects beyond into the path of the corresponding subtracting rack, an illustration of this being shown in Fig. 15, where one of the pins 378 projects through a hole in card 277 into the path of a shelf 206 of the subtractor rack 280 and limits its downward movement. The subtractor racks engage with the elapsed time type wheels and move them in the reverse or subtracting direction. The resultant of the two movements, the adding movement and the subtracting movement, brings upon the printing line the type representing the elapsed time between the first and second operation by the particular workman. This, on the second operation of the machine, is printed in the card on the space (Fig. 60) under the heading "Working time," as there shown the elapsed time being 47 hours, 54 minutes. It will be noted that this is a long period, covering a time much longer than that of a single day, the job in question having commenced a number of days prior to the second or "out" operation. This time, moreover, includes only the time within working hours and excludes the time outside of them. I accomplish the result of obtaining elapsed time running over a period longer than a half a day or a day and including only the working hours of such days as the job may continue over by means presently to be described. The actuation of handle 2 on the "out" operation has also fed the ink ribbon and accomplished certain other minor results to be presently described.

6 is a window in the top casing of the machine, through which are shown the indications of time-of-day indicating wheels 407, 406, 405, 404 (Fig. 8). These indicating wheels are driven synchronously with the time-of-day timing cams and always represent the true time. The time represented in window 6 in Fig. 1 is "PM 1 42."

I will now proceed to describe in detail the specific mechanism in all its parts shown in the drawings.

The timing cams are driven by clockwork. They consist of two separate and independent sets of timing cams, the time-of-day cams 545, 554, 551 and 548 (Fig. 36) and the other the elapsed time timing cams 323, 403, 385 and 254 (Fig. 36). The former set control the time-of-day indication of the time-of-day indicating mechanism, as shown the time-of-day indicating wheels and type wheels. The latter set affect the extent of movement of the elapsed time indicating mechanism, as shown the elapsed time type wheels. The time-of-day set of timing cams are driven continuously by clockwork means and always represent by their condition the true time-of-day. The elapsed time timing cams are, preferably and as shown, driven by clock-controlled means, but are not continuously driven at all times, but are at times disconnected from their driving or controlling means and remain at rest for predetermined periods. This is for the purpose of cutting out those hours not included within the working hours. The elapsed time timing cams are operatively connected with the clock-controlled driving means at the commencement of working hours and are operatively disconnected at their close, either at noon or at the close of the day and this is done automatically. The result is that after a workman "rings in" at the beginning of a job he can work on the job for a period longer than over lunch or the close of the day or covering a period of days before he "rings out" or performs the second or "out" operation on the machine. No matter how long a time (within the range of the machine, which is, however, capable of indefinite expansion) this may be, the correct elapsed time in working hours and minutes only will, at the second operation, be printed upon the card. I will first describe the time-of-day cams and the clock-controlled means for driving them and will later describe the elapsed time timing cams.

*Time-of-day timing cams, clock-controlled means for driving them and the time-of-day indicating wheels.*—These are specially illustrated in Figs. 2, 5, 6, 7, 8, 36—50, 58 and 59. 545 is the "A. M." and "P. M." time-of-day cam. It is loose on shaft 50, but has fast to it a ratchet 634 and an A. M. and P. M. indicating wheel 407. The cam 545 is shown in detail in Fig. 50 and has six rises. The cam and connecting parts are fed forward by pawl 557, loose on rod 232, a spring 322 secured to one end of the pawl and to frame 270 holding the pawl in engagement with the ratchet. 554 is the hour time-of-day cam (Fig. 49) and is similarly loosely mounted on shaft 50 and has secured to it a ratchet 552, an hour indicating wheel 406 and it is fed forward by pawl 556 loose on rod 232 and has spring 321 holding it in engagement. Cam 554 has but one rise and its ratchet 552 is provided with twelve teeth for the hours. 551 is the tens of minutes time-of-day cam (Fig. 48). It is similarly mounted and has corresponding ratchet 549, indicating wheel 405, pawl 555 and spring 312. Cam 551 has two rises with six teeth for each. Fast to cam 551 is a disk 550 for carrying one to the hour cam, as will be presently described. 548 is the minute time-of-day cam similarly mounted, having but one rise, with ratchet 546 having ten teeth, indicating wheel 404 and carrying disk 547, feeding pawl 366 with its spring 311.

The time-of-day timing cams are driven or actuated by clock-controlled means. Any suitable means could, of course, be employed for this purpose. Those I prefer are magnetically controlled or operated. In the specific mechanism shown, the timing cams are fed forward by a relay 61, (Fig. 2). This is energized and deënergized at regular stated intervals. In the machine shown, the magnet is energized and deënergized every minute. This can be effected or controlled by any suitable clock movement. In Figs. 58 and 59 I have shown parts of mechanism for this purpose, together with circuits I prefer to use, but these will be explained later on. Whenever electromagnet 61, fastened to the side frame 66 of the machine by bracket 62 is energized, it pulls up its armature 60 (Fig. 2) pivoted at 59 in the framework. Dependent lug 65 from armature 60 has a pin 64 projecting into a slot in lever 630 pivoted to stud 63. Pivoted at 69 on the left-hand end of lever 630 is link 58, pivoted at 53 to a bell crank lever 52. Rod 232, to which the feeding pawls above described are secured, has its end 51 fast in the end of bell crank 52 and is mounted in side frames 324, 367 and 382.

270 is a frame carried by side frames 324, 367, 382, to which the various springs 311, 312, 321 and 322 are secured. At every energization of magnet 61, rod 232 and frame 270 are rocked upward, carrying with them the feeding pawls and causing any one of those pawls, if in engagement with its corresponding ratchet, to feed the corresponding cam one point. Secured to the other end 54 of bell crank 52, which is loosely mounted on shaft 50, is a piston rod 55 of an oil dash pot 56, loosely pivoted at 57 to the framework; also on 54 is mounted a small counterweight 625. As this dash-pot can be of any suitable construction, its details are not shown. It is for the purpose of preventing too rapid an action of the armature and its connecting parts.

Pawl 366 of the minute time-of-day cam 548 is always in engagement with its ratchet and magnet 61 at every energization, that is, once every minute, will feed forward the cam one unit. Pawls 555 and 556 of the tens of minutes and hour time cams are normally held out of engagement with their respective ratchets 549 and 552, but at the end of a complete revolution of the cam of the next lower denomination, each one of these pawls is let into engagement for one unit of time with its ratchet wheel and at the succeeding energization of magnet 61, feeds forward its cam one point, when it is again removed from engagement with the ratchet. The means for accomplishing this consist of a wiper disk fast with each cam, 550 for the tens of minutes cam and 553 for the hour. Each disk is constructed as shown in Fig. 46. The disk 394 is provided with a notch 395. Each other disk is similarly provided. The pawl of the next higher denomination is provided with a finger fast to its sleeve, having a projection resting upon the disk of the next lower denomination. The same arrangement for carrying is provided between each wheel and the next higher wheel. It is illustrated in Figs. 41, 42 and 43 for the tens of minutes elapsed time pawl. There the pawl 393 has a sleeve 501, to which it is fast and fast to that is a finger 396 having a side projection 392. The finger 396 rests against the periphery of the disk of the next lower order and this holds the pawl out of engagement with its own ratchet normally, but at the conclusion of a complete revolution of the cam of the next lower denomination, the finger 396 enters a notch corresponding to notch 395 of disk 394, letting its pawl into engagement with its ratchet. At the next actuation of magnet 61, the pawl feeds its ratchet, but immediately thereafter finger 396 rides up on the periphery of the disk and lifts the pawl out of engagement with its ratchet. In this way, the cam of the lowest denomination is continuously driven by clock-controlled means and one is carried at each revolution to the wheel of the next higher denomination and so on.

150 is a squared stop bar secured in the side frames for preventing the overthrow of the feeding pawls. As all of these pawls except the lowest may occupy either one or the other of two positions, I preferably provide each pawl with a notch 383 and surface 384 (Fig. 37), one or the other of which will strike the stop bar 150 and the pawls be forced inward and jammed between the bar and the tooth of the ratchet wheel and thus prevent excessive movement on the part of the wheel. The cams and pawls shown in the various sections are shown in the positions they occupy at the second or "out" operation of the machine represented on the card as occurring at 1.42 P. M. The time-of-day cams are thus always continuously driven and are always in a position to represent the true time. The A. M. and P. M. cam is advanced one notch at each complete revolution of the hour wheel. For purposes of indication through window 6, its periphery is provided with the characters "A. M." and "P. M." alternately arranged. Every twelve hours, therefore, the change is made from one to the other.

553 is the hour carrying disk and this carries to the A. M. and P. M. wheel.

I will now proceed to describe the elapsed time timing cams and the clock-controlled means for driving them during certain periods of time only, the cams being at rest at all other times.

*The elapsed time timing cams, their driving mechanism, the magnetic cut-out mechanism.*—These are especially illustrated in Figs. 8, 18, 19, 20, 36–46, 58 and 59. These timing cams are 323 the tens of hours, 403 the hours, 385 the tens of minutes and 254 the minutes. These are each loosely mounted on shaft 50 and each has fast to it a ratchet and with the exception of the tens of hour cam, each has fast to it also a carrying disk and each is provided with a feeding pawl. The feeding pawl, all but the minutes, is similarly provided with a finger fast on its sleeve, being a side projection resting upon the periphery of the carrying disk of the wheel of the next lower denomination, as already described for the time-of-day cams. Each feeding pawl is also loosely mounted on rod 232 and is provided with a similar spring.

The minute cam 254 and connecting parts is shown in Fig. 37. 266 is the ratchet, 397 the carrying disk, 269 the pawl, 271 its spring. The wiper of pawl 390 is shown with a projecting arm 313. Each wiper of a higher order has such a projection extending back of the next lower actuating pawl. These lift all of the higher pawls out of mesh when the cut-out mechanism lifts the lowest pawl out of mesh. Cam 254 is shown with but one rise, and its ratchet 266 with ten teeth.

Tens of minute cam 385 is shown in Fig. 38. It is provided with two rises with six teeth to each in its ratchet 399. 398 is its carrying disk, 390 its pawl, 392 the side projection of the pawl and 387 its spring.

The hour cam 403 is shown in Fig. 39 and is provided with but one rise with ten teeth in its ratchet 401. 400 is its carrying disk, 393 its pawl with its wiper 396, 391 its projection resting on the pawl of the next lower wheel and 388 is its spring.

The tens of hours cam 323 is shown in Fig. 40. It has one rise and has ten teeth in its ratchet 402. 389 is its pawl and 386 is its spring.

In Figs. 58 and 59 I have illustrated a preferred magnetically controlled cut-out mechanism, together with circuits adapted for use therewith and for controlling a number of elapsed time indicating machines from a common source of power 17. 18, 18 represents any conventional clock movement. 572 is a wheel adapted to be rotated every minute carrying an insulated disk 561 mounted on shaft 573 to which wheel 572 is also fast. Disk 561 has a single tooth. 571 is a contact arm fastened to insulated block 564 and normally pulled downwardly by spring 563 and having at its end a projection 568 carrying a downward contact pin 569. 570 is an arm fast to insulated block 564ᵃ and normally pulled downward by spring 562. The ends of arms 570 and 571 rest against the disk of 561 and as it rotates they are gradually raised. In this position of the parts contact arm 570 and pin 569 are separated. The tooth of disk 561 passes the extreme end of 571, the latter slipping downward off the tooth and making contact between 570 and 569. An instant later the end of 570 drops off the tooth again separating 569 and 570. A momentary contact is thus made every minute. When the finger of disk 561 brings contacts 569 and 568 together, it closes a circuit through magnet 15 (Fig. 59), energizing that magnet and attracting its armature 459 against the tension of spring 460. This circuit runs from contacts 568, 569 on one side through lever 570, wires 565, 567, battery 16, switch 601 adapted to be manually operated whenever desired, wire 19, magnet 15, lever 602, adapted to be manually operated when desired to open the circuit permanently, wires 20, 14, 566, lever 571 back to contact 568. Magnet 15 is thus momentarily energized every minute, closing contact between 459 and contact 462, 461 being the back stop for armature 459. This closes the circuit from common source of power 17, represented as an electric generator, through magnet 61, such as is illustrated in the mechanism of the present machine. This circuit runs from motor 17 through one side of double switch 604, wire 25, armature lever 459, contact 462, wire 21 common wire 609, connecting block 10, wire 612, magnet 61, return wire 28 and 11, common wire 610, 22, arm of switch 604 back to motor 17. The circuits are also shown for simultaneously energizing magnets 61' and 61'' through tap wires passing through connecting block 10', wire 612', 28', back through 10' and 11', to common wire 610 and with magnet 61'' through tap wires passing through connecting block 10'', 612'', 28'', 11'' back to common wire 610. Thus a common source of power generator 17, is made to actuate a plurality of time mechanisms like the one shown in detail herein. 13, 13' and 13'' are ordinary condensers connected with the above circuit by tap wires 23 and 24, 23' and 24' and 23'' and 24'' respectively.

From the above, it will be seen that with manual switches 601 and 602 closed, the clock movement will energize magnet 61 every minute, causing the feeding pawls of the time-of-day cams to feed those cams as already described. This provides a series of time-of-day cams actuated by magnetically operated clock-controlled means. The cams composing a series of different denominations of time are provided with carrying means for progressively carrying from one wheel of lower denomination to that of the next higher denomination. It will also be seen that these time-of-day cams are continuously driven without interruption, and by an intermittent step by step movement. This step by step movement takes place with each minute beat of the clock. Magnet 61 also similarly and intermittently feeds forward the elapsed time timing cams whenever it is operatively connected with them. The means shown for operatively connecting or disconnecting magnet 61 from its feeding pawls will now be described. This is accomplished through a magnet 523 which serves to cut in or out clutch mechanism forming part of the connections between magnet 61 and the said feeding pawls.

584 is a clock driven disk provided with a series of circuit opening and closing devices adapted at predetermined times to open and close the circuit through magnet 523. Disk 584 is driven from the clockwork through shaft 581, beveled gears 582 and 580, pinion 583 meshing with teeth of disk 584 which is mounted on shaft 590. The parts are so arranged that the disk 584 is driven one revolution in twenty four hours.

587, 588, 589 and 595 are a series of insulated contacts on 584, adapted to strike the end of spring arm 635 and force contact point 636 against contact 637 on spring arm 586, momentarily making contact between 636 and 637. Spring arms 586 and 635 are mounted in insulating block 591 and are normally pulled downward by the two springs 592. Insulating block 638 normally holds the spring arms apart and except when one of the contacts 587, 588, etc., is in contact with the end of the spring 635, the circuit is broken between 636 and 637. At the moment, however when one of the contacts 587, etc., strikes spring 635, 636 and 637, makes contact and closes a circuit through magnet 605 (Fig. 59) this circuit runs as follows: from spring arm 635 through wire 593, 26, manual switch 600, magnet 605, wire 19, manual switch 601, battery 16, wire 567, 578, 594 to spring arm 586. This energizes magnet 605 and closes its armature 608 against the tension of its spring 603, pulling it forward from its back stop 598 and making contact with its front contact 599. This closes a circuit from common source of power 17, through magnet 523 as follows: generator 17, one side of switch 604, wire 25, wire 607 armature 608, contact 599, wire 606, common wire 611, connecting block 10, wire 639, magnet 523, wire 613, 28, 11, common wire 610, wire 22, the other branch of switch 604 back to generator. Magnet 523 is thereby energized and feeds forward ratchet wheel 532 one point, throwing ratchet 266 of the minute elapsed time timing cam 254 into mesh with its feeding pawl 269. Ratchet 266 remains in mesh with its pawl and its corresponding minute elapsed time timing cam 254 is fed forward at each minute continuously from that time on, and with it of course by the carrying operation each cam of higher denomination of the elapsed time timing cams, until the next contact 588 on disk 584 makes contact with the end of spring arm 635. This again closes the circuit through magnet 605 and thus through magnet 523, again feeding forward ratchet 532 one tooth and permitting tooth 531 of lever 530 to fall into a cut-away portion of ratchet 532, removing ratchet 266 from mesh with its pawl 269. The feeding of the elapsed time timing cams thereupon ceases and these cams are at rest until the next contact 589 on disk 584 again similarly closes the circuit through magnet 523 and again brings ratchet 266 into mesh with pawl 269, where it stays until the next contact piece 595 again removes it in the same manner.

The contacts 587, 588, 589 and 595 may be arranged at any predetermined points that may be desired upon disk 584 and for this purpose are adjustable in a slot 585 in that disk. For convenience, I have shown the face of disk 584 as divided into twenty-four divisions, each one representing an hour and they are numbered to correspond with the hours of A. M. and P. M. time accordingly. In the arrangement shown in Fig. 58, 587 is arranged at 7 A. M., 588 at 12 M., 589 at 1 P. M. and 595 at 5 P. M. Accordingly, the elapsed time timing cams are driven by the clock-controlled means from 7 o'clock in the morning until 12, remain at rest until 1 o'clock, are again driven until 5 P. M. and then remain at rest until 7 o'clock on the following morning. They are thus alternately actuated or at rest for predetermined periods of time, being started and stopped at predetermined intervals. This is done by means of a magnetically controlled clutch which operatively disconnects or connects these cams to their driving means. By these means the cams form a time storing or adding device composed of a series of different denominations, the lower carrying to the higher in the ordinary manner, and adapted to add from day to day the time within the working periods of the day and not to add the time outside of those periods. By the condition of these cams at any time the total of such working times thus added is indicated and by suitable mechanism, such as that presently to be described, such indications are conveyed to type wheels and are used for the purpose of obtaining and recording the elapsed time between two operations by the same workman. By these means, such operations may be days apart and yet only a single time identification record upon a card needs to be made at the time of starting and be used at the close for causing an automatic computation to be made of the elapsed time between such starting time and the time of the closing of the job. These cams form a continuous and progressive series of indications, excluding from the computation all the times of disconnection.

In order to prevent any interference with the regular operation of the clock-controlled means, when the magnetic clutch is operated, I preferably place in the circuit of magnet 605 another set of contacts 575 and 576 (Fig. 58), which contacts are closed by the insulated disk 561 between the times when it operates the contacts 568 and 569. Arms 576 and 575 are similarly mounted to insulated blocks 577ª and 577 and are provided with springs 574. Arm 575 has a projection 568 provided with a pin 569. These spring arms are arranged diametrically opposite spring arms 570 and 571 with reference to disk 561. In the same manner the contacts 576 and 569 are normally apart, but when the tooth of disk 561 passes them they are momentarily brought into contact in the same manner as described for the other contacts. In this case, the circuit through magnet 605 from spring contacts 636 and 637 passes from wire 578 through wire 596, arm 576, and arm 575, wire 597 to wire 567. Contacts 575 and 576 are thus in series with contacts 636 and 637 and both must be closed at the same time in order to energize magnet 605. As shown, this can only be done at times, when contacts 576 and 575 are operated. There can, accordingly, be no interference with the regular operation of energizing and deënergizing magnet 61 by the connecting or disconnecting of the clutch at the same point of time.

523' and 523" are two magnets supposed to be placed in other elapsed time indicating machines similar to the one shown and described herein and are adapted to co-act with magnets 61' and 61" in such machines. These two magnets 523' and 523" are operated through magnet 605 and generator 17, the circuits through these magnets respectively containing extra tap wires from common wire 611 as follows: 10', 639', 613', 28', 11', common wire 610 for magnet 523' and from common wire 611, as follows, viz., 10", 639", 613", 28", 11", back to common wire 610. 615' and 616" are the ordinary condensers connected on one side by wires 614' and 614", and on the other to wires connecting to 24' and 24". It will thus be seen that there are two separate and independent sets of timing cams, one the time-of-day timing cams, adapted to control the time-of-day recording wheels 148, 422, 424 and 365, always continuously driven by the clock-controlled means and always representing the true time; and the other the elapsed time timing cams, only driven during predetermined periods or intervals of time, but storing or adding up from day to day such time intervals and adapted to control elapsed time indicating devices, as shown, elapsed type wheels 423, 421, 420 and 245 respectively, to cause them to move one way, the adding way, to represent a time corresponding with that represented by the then condition of the elapsed time timing cams, and also controlling other time indicating devices consisting of a series of punches so as to cause the punches to punch holes in the card on an operation of the machine, the location of which holes will represent the time represented by the then condition of the elapsed time timing cams. This latter punching operation is done at the beginning of a job and a record is thus imprinted upon the card of the then condition of the timing cams. At a later operation of the machine, the holes thus punched in the card will control the movement of subtracting mechanism adapted to move the elapsed time type wheels in the reverse or subtracting direction so as to subtract from the time represented on them, corresponding with the then condition of the elapsed time timing cams at such second or later operation, the time corresponding with the condition of those cams at the time of the first operation. This will, of course, give the elapsed time in working hours between the two operations, irrespective of whether the second operation is made during the same half of the day as the first one or the same day or days later.

I will now proceed to describe the connecting means between the time-of-day cams and the time-of-day recording type-wheels.

*Connections between the time-of-day cams and the time of day recording type wheels.—* These are specially illustrated in Figs. 4, 7, 8, 9, 12, 36, 47, 48, 49, 50 and 56. 545 is the timing cam for the "A. M." and "P. M." type-wheel 148. 554 is the timing cam for the hour type-wheel 422, 551 the timing cam for the tens-of-minutes type-wheels 424, and 548 the timing cam for the minute type-wheel 365. The hour and minute and tens-of-minutes type wheels stand normally at zero, that is with zero on the printing line. At each operation of the machine by handle 2 these wheels are rotated so as to bring upon the printing line the hour and minute represented by the condition of their timing cams at that moment, or in other words the type-wheels are moved so as to correspond with the then condition of their timing cams. The connection from each timing cam and its type-wheel is the same in each case and I will describe that connecting the minute cam 548 with the minute time-of-day wheel 365. These connections are specially illustrated in Fig. 7. In Fig. 7 the timing cam is shown as standing at the position represented by the figure 2, representing two minutes. 376 is a wiper loosely pivoted on stationary shaft 157 and having the roller 255 bearing upon the surface of cam 548. The wipers for the other cam wheels are similarly loosely pivoted on shaft 157. Spring 329 attached to rod 233 normally holds the roller against the cam surface. Wiper 376 is provided with sector teeth meshing with gear teeth 373 on sector ratchet 310 loosely mounted on shaft 159. Sector ratchet 310 has a series of ratchet teeth at its lower end. The position of sector 310 at any time will be dependent upon the position of the timing cam 548. Sector 310 is operated through driving mechanism, actuated by handle 2, having always the same extended movement or stroke. This mechanism consists of a frame composed of two arms, 247, 247 (Figs. 9, 56) connected by a universal bar 250, the two arms 247, 247 being mounted fast on shaft 159. 247, 247 are also connected by the small rod 248 and shaft 252 upon which is loosely mounted pawl 331. There is one of these pawls for each sector ratchet, pawl 437 for the tens-of-minute sector ratchet 434, pawl 436 for the hour sector ratchet 435 and pawl 208 for the sector ratchet 207 of the A. M. and P. M. wheel. Spring 334 secured to pawl 331 and at the other end to rod 248 normally holds the pawl in engagement with the teeth of the lower end of sector ratchet 310. Similar springs (not shown) are provided for the other sector ratchets. Shaft 159 is rocked at each rocking of main shaft 32 by means of cam 169 (Fig. 4) engaging roller 170 on sector lever 161 loosely pivoted on shaft 172, the teeth on sector 161 engaging teeth on sector 160 fast on shaft 159. The roller 171 on sector 161 is for the purpose of positively returning the parts to their normal position on the return of shaft 32.

A movement of shaft 159 rocks frame 247, carrying with it the pawls 331, 437, 436 and 208 moving them toward the left, as viewed in Fig. 7. This movement is always one of the same extent. On the return to normal position at the extreme right-hand end of the movement the pawls strike a bar 234, rocking them and disengaging pawl point on the left hand end of the pawls from the teeth and their respective sector ratchets, as shown in Fig. 7. In all other positions of the frame 247 the springs hold the pawls in engagement with the teeth of the sector ratchet. Immediately after the commencement of the leftward movement of frame 247, during the actuation of handle 2, the pawls engage their sector ratchets and each pawl moves its corresponding sector to the left a distance corresponding with the leftward movement of the pawl. In this movement the particular ratchet tooth of the sector ratchet that its pawl will engage will depend upon the position of the sector and as previously explained this will depend upon the position of its corresponding timing cam. In the position of the parts shown in Fig. 7 pawl 331 when released from bar 234 will engage with the second tooth of ratchet sector 310 as timing cam 548 stands at its second position. Accordingly the left hand end of sector 310 will be moved to the left a distance depending upon its initial position at the moment pawl 331 engages with it. It is then moved to the left the full distance the pawl 331 is moved. In the course of its movement it will engage pin 320 on gear sector 330 loosely mounted on shaft 159 and will rotate it to the left and upward. This movement to the left is limited by the stop rod 224 with which the nose of each pawl comes into engagement. With the timing cam at zero the left hand end of sector 310 is just nine points distant from pin 320. Accordingly the extent of movement of sector 330 will depend upon what tooth on sector ratchet 310 pawl 331 engages with when released and this is determined by the position of the timing cam as previously explained. This movement of the parts will rotate wiper 376 remove its roller 225 from contact with cam 548, carrying the roller entirely out of the path of the cam. In this position the timing cam can rotate for any length of time without striking the wiper and the timing cams will be unaffected by any prolongation of the recording operation and they will always represent the true time and when the wipers are returned to their original positions they and their corresponding sector ratchets will be in a position representing such true time.

Rack teeth 368 on sector 330 mesh with rack teeth 363 on time-of-day rack 354. This rack is guided by the two guide rods 221 and 223 projecting from the side frames of the machine through slots 505 and 506 in rack 354. These rods, of course, project through corresponding slots in all of the other time-of-day racks. The slots are long enough to permit rack 354 to move upward a distance corresponding to nine movements and to do this in a perfectly straight line. Rack 354 is normally kept in its lowermost position by a light tension spring 364 fast at its upper end to a small pin 284 fast to the upper end of the rack, the spring at its lower end being fast to rod 177 secured in the said frames of the machine. A series of teeth 341 are cut in the opposite side of the rack and these engage with the spur gear 361 fast to minute type-wheel 365, the gear type-wheel being loose on shaft 181.

Each of the tens-of-minutes type-wheel 424 and the hour wheel 422 is provided with a similar pawl, sector ratchet, gear sector and time-of-day rack. Those of the tens-of-minutes wheel 424 are pawl 437, sector ratchet 434, gear sector 428 with its pin 427 and time-of-day rack 432. Those of the hour wheel are pawl 436, sector ratchet 435, gear sector 430 with its pin 429 and time-of-day rack 433.

It will be understood, of course, that the upward movement of each time-of-day rack will depend upon the position of the corresponding time-of-day cam and the corresponding time-of-day type-wheel will be rotated a corresponding distance, bringing upon the printing line type representing the minute or hour represented by the then position of the corresponding timing cam. In this way the time-of-day type-wheels are set at the time-of-day representing the time of the operation of the machine and when the printing hammers are operated, this time is printed upon the card inserted in the slot.

Each timing cam is provided with a pawl to prevent backward rotation. That of 548 is pawl 325 mounted loosely on rod 158 and held by spring 326 fastened to rod 276 in engagement with the ratchet 546. The wipers for the tens-of-minutes timing cam and that of the hour timing cam are not shown but are similar to 376 (Fig. 7).

Fig. 12 illustrates the train of mechanism for the A. M. and P. M. time-of-day wheel 148. This wheel is provided with only two type as shown in the figure, one representing A. M. and the other P. M. This wheel is moved either so as to bring the A. M. type or the P. M. type at the printing line and this is done by means of cam 545. This cam has six rises and six depressions. The connections between it and wheel 148 are similar to those already described for the hour and minute type-wheels. 262 is the wiper with roller 560 bearing against the cam normally held there by 249. 267 is the pawl for preventing backward rotation. 207 is the sector ratchet having gear teeth meshing with teeth 278 of wiper 262, 208 its pawl provided with spring 236, 431 the gear sector with pin 188 and gear teeth 287 engaging teeth 288 of rack or floating piece 166, the teeth on the opposite side of the rack engaging gear 149 fast to type-wheel 148, this type-wheel and its gear wheel being loose on shaft 181. As already described cam 545 is fed forward one tooth at the end of each twelve hours. If the cam is on a rise sector gear 431 will move upward one point, shifting the "A. M." type which is normally on the printing line of wheel 148 off that line and bringing the "P. M." type on that printing line. If the wiper is in a depression of 545 sector 431 will not be moved at all. The pawls 208, sector ratchet 207 and gear sector 431 operate in the same way as described for similar parts in the time-of-day mechanism. 289 and 290 are short slots in rack 166 and 291 is its spring.

It will be understood from the above that the A. M. and P. M. type-wheel will always have upon the printing line type representing either one or the other of these abbreviations; also that at every operation of the handle 2 the hour, tens-of-minutes and the minute type-wheels will be removed from their zero or normal position to a position that will bring upon the printing line type representing the then position of their corresponding time-of-day timing cams, or in other words, type representing the time-of-day of the operation of the machine. This takes place at every operation of the machine and the time is printed upon the card either as "in" time in the "in" space 620 of the card or as "out" time in the "out" space 621 of the card.

I will now proceed to describe the particular mechanism shown by which the elapsed time type-wheels are moved in one direction in accordance with the position of the elapsed time timing cams at such operation.

*The elapsed time type-wheels and their connection with the elapsed time timing cams.* — These are specially illustrated in Figs. 5, 6, 8, 9, 10, 27–32, 36–46 and 56. There are four elapsed time type-wheels, 245 the minutes (Fig. 9), 420 the tens-of-minutes, 421 the hours and 423 the tens-of-hours. These wheels are capable of printing up to ninety-nine hours and fifty-nine minutes. They stand normally at zero and are moved, upon the operation of handle 2 to a position to correspond with the condition at that time of their corresponding timing cams. These timing cams are shown in Fig. 36 and are 254 for the minutes, 385 for the tens-of-minutes, 403 for the hours and 323 for the tens-of-hours. These timing cams are moved only within certain stated intervals, namely the working hours of each day as has been already fully described. The position of these cams progresses from day to day, or in other words, the time of the working hours is added upon them from day to day until their limit of ninety-nine hours and fifty-nine minutes is reached. Of course, by increasing the number of these wheels the machine is capable of indefinite expansion in its elapsed time indicating capacity. At the turn of the handle 2 these elapsed time type-wheels are moved one way to correspond with the then condition of their timing cams and this would bring them so as to represent the total of the time indicated by the condition of those wheels. At the "in" operation of the machine the wheels are thus moved but no record is made as the printing device is then out of operative connection as will be presently described. But at an "out" operation of the machine the elapsed time type-wheels are moved in this way or in their adding direction according to the position of their cams and are moved the reverse way by the subtracting devices, presently to be described, which move them in this reverse or subtracting direction a distance corresponding with a prior condition of the elapsed time timing cams, namely their condition at the first or "in" operation of the machine by the same workman. I will first describe the adding movement of these type wheels.

The connection between the elapsed time timing cams and the elapsed time type-wheels resembles in many respects that between a time of day timing cam and its type-wheel. The connection between each elapsed time timing cam and its type wheel is the same as between any other elapsed time timing cam and its type-wheel. Figs. 5 and 6 illustrate these connections for the minute type wheel 245 and its timing cam 254. Fig. 5 showing the parts before the operation by handle 2 and Fig. 6 showing the parts in the recording position. Referring to the minute indicating mechanism, 256 is the wiper provided with teeth 471 loosely pivoted on shaft 157 and provided with roller 255 and held upwardly by spring 275. 246 is the sector ratchet with teeth 472 meshing with teeth 471. 246 has a series of teeth 473 on its lower end with which pawl 251 engages when free from rod 234 as already described. 176 is a gear sector and 272 its pin and 474 its gear teeth meshing with gear teeth 475 on rack 235. 506 and 505 are the slots of this rack through which pass rods 221 and 223 and 265 is its spring. The operation of these parts is exactly the same as that described in the case of the time-of-day mechanism and the height to which rack 235 will be lifted at any operation of the machine will be dependent upon the position of the corresponding timing cam. 476 are teeth cut in the lower opposite edge of rack 235 and these teeth engage with a floating pinion or differential gear wheel 238. This differential also meshes with another rack 205 which is used for subtracting purposes as will be presently described. This subtracting rack 205 is similarly mounted, being provided with slots 507 and 508 through which pass guide rods 218 and 222. Of course, a differential gear and a subtracting rack are provided for each type-wheel. The differential gear-wheel for the tens-of-minutes type-wheel is 476$^a$ and its subtracting rack is 279. The differential gear for the hour type-wheel is 482 and its subtracting rack 280 and the differential gear for the tens-of-hours type-wheel is 485 and its subtracting rack is 332 (Fig. 10). The construction of these differential gear wheels and their connections is shown in greater detail in Figs. 27 and 28. Secured to each of these differential gears is a differential rack. The racks are numbered 220, 281, 282 and 283 respectively (Fig. 9).

The particular differential gear and rack shown in Figs. 27 and 28 are the tens-ofhours differential gear 485 provided with teeth and rack 283. The others are constructed in exactly the same manner except only as to the borrowing mechanism which will be described later on. The rack 283 is provided at its lower end with a slight offset 477 into which a shouldered stud 417 is driven. Mounted freely on this stud is the hour differential 309. The cover plate 416, also provided with an offset 478, is riveted to the rack by rivet 419. Both the rack itself and the cover plate 416 are provided with outwardly extending ears 479, between which the tens-of-hours substracting rack 332 and the tens-of-hours rack 314 work freely. This construction keeps the differential gear firmly in mesh with both of these racks at all times. A hole 418 is drilled through the center of stud 417 to receive the rivet 308 by which the lever 306 is attached to the rack 283. This lever 306 corresponds in the hour arrangement to the lever 237, in the minute mechanism shown in Fig. 5. The purpose of these levers and the corresponding levers of the minutes, tens-of-minutes and hours mechanism is to exert a strong downward pull on the differential racks 220, 281, 282 and 283 respectively. For this purpose a tension spring is provided for each lever, that for lever 237 is numbered 229 and is shown in Fig. 5 and is fastened to rod 180 as are the other tension springs. In the normal position of these parts the elapsed time type-wheels stand at zero, the time-of-day racks 235, etc., are in their lowermost position, the subtracting racks 205, etc., are in their highest position and the differential racks stand at the zero position. The differential racks 220, 281, 282 and 283 are each provided with a series of teeth 480 meshing with its corresponding type-wheel. Each type-wheel and its pinion are loose on shaft 181. Accordingly as a differential gear and its rack rise or fall, its corresponding type wheel will be rotated one way or the other. The type on the type-wheel are so arranged that as the differential rack rises it will tend to add on the wheel, that is to rotate it from zero upward. 219 is a guide bar for holding the differential racks in proper alinement and for that purpose passes through a slot in each rack.

The pawls for operating the sector ratchets of the elapsed time type mechanism are mounted on rod 252 of frame 247 just as are the pawls of the time-of-day mechanism already described and they are provided each with a spring 253 fastened to rod 248 and are moved out of mesh with their sector ratchets by the pawls striking the rod 234 when the parts are in their normal or zero position. These parts for the various sector ratchets and also the gear sectors and ratchets, differentials and differential racks are as follows: For the minute sector ratchet 246 they are pawl 251 and its spring 253, sector ratchet 246, gear sector 176 with pin 272 and gear teeth 474, rack 235 with gears 475 and 476, the spring 265, slots 505 and 506, differentials 238 and differential rack 220. For the tens-of-minutes sector ratchet they are pawl 443, spring sector ratchet 440, gear sector 355 with its pin 357, rack 359, slots 505 and 506 and its spring 265, differential 476ª, subtractor rack 279 with its slots 507 and 508. Those for the hour sector ratchet 441 are as follows: Pawl 444, sector ratchet 441, gear sector 356 with its pin 358 and teeth 474, rack 360 with its teeth 475 and 476, its slots 505 and 506 and its spring 265, differential 482, subtractor rack 280 with its slots 507 and 508. Those for the tens-of-hours sector gear 442 are pawl 445 and its spring, sector gear 442, gear sector 328 with its pin 327 and teeth 474, rack 314 with its teeth 475 and 476 and its slots 505 and 506 and its spring 265, differential gear 485, and subtractor rack 332 with its slots 507 and 508.

Frame 247 and the pawls for these various mechanisms will operate in the same way, as previously described in the time-of-day mechanism, to force the sector ratchets 246, 440, 441 and 442 to the left, as viewed in Fig. 5, until they strike the pins on the gear sectors 176, 355, 356 and 328 respectively, causing the teeth of each gear sector to mesh respectively with the teeth of the racks 235, 359, 360 and 314, rotating and raising the differentials 238, 476ª, 482 and 485, thus rotating the elapsed time type-wheels 245, 420, 421 and 423 respectively. Each type-wheel will be rotated to an extent corresponding with the position of its respective elapsed time timing cam so that there will be brought upon the printing line opposite the elapsed time printing hammer 137 type representing respectively the minute or tens-of-minutes or hour or tens-of-hours represented by the then position of the respective elapsed time timing cams 254, 385, 403 and 323 respectively. In other words, the type thus brought upon the printing line will represent the true time of the operation of the machine. During this operation the wipers are entirely removed from the path of the timing cams so that any length of time may be consumed in the printing operation without interfering with the continued rotation of the timing cams under the impulse of their time-controlled driving mechanism.

Fig. 5 illustrates one of the elapsed time type-wheels and its train of operating mechanism, in the position they occupy when the machine is not being operated, at which time the type wheel is at zero. Fig. 6 illustrates the mechanism after handle 2 has been operated and when the parts are in the recording position.

The above description of the movement of the differentials and the elapsed time typewheels has, for purposes of clearness, been given as if the subtractor racks 205, 279, 280 and 332 had meanwhile been standing still, in which case the differential under the influence of the racks 235, 359, 360 and 314 would be moved upward, rotating the elapsed time type-wheels as described, the differentials rolling up on the subtractor racks. As a matter of fact in the elapsed time operation of the machine, as shown, the subtractor racks are falling at the same time as the racks 235, etc., are rising. If the downward movement of the subtractor racks 205 is at the same rate as the upward movement of the racks 235, etc., the differential will simply rotate without rising or falling until one or the other of the racks has stopped, whereupon the other rack in the rest of this movement will move the differential upward or downward as the case may be, the resultant of the two movements being alone what affects the movement of the differentials. It is immaterial in what order these upward and downward movements take place, whether simultaneously as shown or at the same rate if simultaneously, or whether successively. The result is the same in each case as will clearly appear when the subtractor racks are fully described hereafter. Before describing the subtractor racks, however, I will first describe the means for selecting the proper punches and for punching the time identification marks on the card in accordance with the time of a first or "in" operation of the machine, which identification marks or holes in the card will at a later or second operation of the machine by the same workman, control the extent of the downward movement of the subtracting racks.

*The punch selectors, their connections with the timing cams and their operating means.*—These are specially illustrated in Figs. 4, 5, 6, 8, 9, 10, 13, 51, 52, 53, 54, 55 and 56. In my improved machine a record of the time of the operation of the machine is also made by punching holes in a card, the holes constituting time identification marks indicating by their location the time of the operation of the machine. Preferably this method of recording I employ only at the first or "in" operation by a workman, as for example, at the commencement of a job, although if desired such a record may be made at any operation of the machine. Any suitable punching mechanism may be employed. In the machine shown I provide a series of punches for each denomination of time represented by the elapsed time timing cams. These punches are 122 and the four series are shown in Fig. 8. In Fig. 4 the minute series is shown. Of course, a suitable number of punches is provided for each series, ten for the minutes, six for the tens-of-minutes, ten for the hours and ten for the tens-of-hours. The particular punch in each series corresponding with the position of the corresponding elapsed time timing cam and, therefore, representing the time of operation, is selected by a punch selector. There are four of these, one for each series, 144 for the minutes, 352 for the tens-of-minutes, 353 for the hours and 145 for the tens-of-hours. Each punch selector is controlled by its corresponding timing cam and is set at each operation of the machine in accordance with the then position of the timing cam.

Referring to the punch mechanism, as shown in Fig. 4, the punches 122 are steel rods mounted in two guide plates 146 and 260 and each is fitted with a collar 123. The punches work easily in the guide plates. A die plate 125 (Fig. 55) is arranged at one side of the card slots 1 and 1ª, and supported on brackets 121 and 129 and screwed to side frames at points 463, 464 and 465 (see Fig. 55). Die plate 125 is provided with holes registering with those in the guide or stripper plate 260. Fig. 55 is a face view of guide plate 260. The holes opposite the punches are numbered 336 and correspond in number to the punches in each series. The levers 124 are provided in order to return the punches to their normal position. These are operated by the punch operating mechanism as will be presently described.

The punch selectors are controlled in their selecting movement by the elapsed time timing cams, the same cams which control the elapsed time type-wheels as already described. Any suitable connections may be provided between these timing cams and the punch selectors. In the form shown in the drawings I have shown the punch selectors 144, 352, 353 and 145 as operated from the gear sectors 176, 355, 356 and 328 which operate the elapsed time type wheels of the same denominations of time respectively in their adding movement or direction as already described. This is accomplished by means of two sets of cross-overs, one set connected with a series of selectors meshing with pinions, the latter meshing with sectors which are connected by a second set of cross-overs to the selectors themselves. The first set of cross-overs consists of cross-over 257 fast to minute gear sector 176 at one end and fast at the other end to sector 446 (Figs. 9, 12 and 56); cross-over 258 fast at one end to tens-of-minutes gear sector 355 and at the other end to sector 349; cross-over 259 fast at one end to hour sector gear 356 and at its other end to sector 348; and cross-over 47 fast at one end to the tens-of-hours gear sector 328 and at its other end to sector 162 having gear teeth 483 (see also Fig. 4). These cross-overs, or the main cross-overs as we will call them, are integral with their respective gear sectors and are loosely mounted on shaft 159. Just as the gear sectors themselves are moved to an extent corresponding with their elapsed time timing cams so are sectors 446, 349, 348 and 162. The latter sectors mesh respectively with pinions 447, 351, 350 and 167 (Fig. 9) loose on shaft 182. These pinions, with the exception of the hour one 350, engage respectively with racks fast to cross-overs fastened at their other ends, to the minute, tens-of-minutes and tens-of-hours punch selectors. Minute pinion 447 engaging with rack 489 connected by cross-over 487 with the minute punch selector 144; pinion 351 engaging with rack 490 connected by cross-over 486 with the tens-of-minutes punch selector 352; hour pinion 350 meshing directly with a rack on hour selector 353 itself without any cross-over and pinion 167 meshing with sector 492 connected by cross-over 488 with the tens-of-hours punch selector 145. By means of this connection at each operation of the machine the punch selectors 144, 352, 353 and 145 are moved downwardly upon the operation of handle 2 in accordance with the then condition or position of the corresponding elapsed time timing cams 254, 385, 403, and 323, exactly as the corresponding elapsed time type-wheels are rotated a corresponding distance. Normally the punch selectors stand at their uppermost position, as shown in Fig. 4, opposite the highest punch in the corresponding series of punches. This is the zero position. If the corresponding cam at the operation of the machine is standing at the position representing 5 the corresponding punch selector will be moved down five points and will stand opposite the sixth punch which represents the fifth unit of the series. When the punches are operated, this punch will punch a hole in the card, if there be one opposite it as there is in the first operation of the machine, and the location of the hole in the card will represent the fifth unit of that denomination of time and later it will control its corresponding subtracting rack in the subtracting operation to permit it to fall five points.

The reason for providing the double set of cross-overs, the main cross-overs and the supplementary cross-overs 486, 487 and 488, is because each set of cross-overs necessarily reverses the order of the denominations of time and in order to have the punches face the card in the same order as the elapsed time type-wheels face it and the same order as the timing cams, it is necessary to provide a second set of cross-overs in order to again reverse the positions necessarily assumed in the first cross-over arrangement. This, moreover also enables the card to also face always the same way in the card slot, whether having the punching of the time holes done in it as is done on the first operation, or presenting those holes to the pins controlling the subtracting racks as in the second operation. No cross-over is required for the hour selector 353 as it happens to stand directly opposite its pinion.

In order to keep the punch selectors in proper alinement with the punches, each punch selector is bent over at right angles at the top and through the hole in the top passes a vertical rod. The four rods are 80 for selector 145, 79 for selector 353, 78 for selector 352 and 71 for selector 144. These four rods are fastened tightly in the bent metal piece 70 shown in Fig. 4. The bent-over portions of the respective selectors and the holes in them are numbered 127 and 518 for selector 353, 126 and 517 for selector 352, 98 and 516 for selector 144 and 128 and 515 for selector 145 (see Figs. 51–54). The teeth on hour selector 353 meshing with its pinion are numbered 509. The teeth on sector 490 are numbered 504, those on sector 489 are 503, those on sector 492 are 484 (see Figs. 51 to 54). Slots are provided in each of the punch selectors and their racks with which they are connected by cross-overs through which passes rod 439 secured to the frame work and sub-frame 438 to guide the rods in their vertical movement. These slots in the different selectors are shown in Figs. 51–54 and are numbered 491 for selector rack 353, 493 and 494 for 352 and its rack 490, 495 and 498 for selector 144 and its rack 489, and 500 and 499 for selector 145 and its rack 492. Preferably I make each selector of one piece of metal.

The means shown for operating the punch selectors are as follows: A shaft 174 extends across the machine and is fast in both side frames 66 and 68. Loosely mounted on this shaft are the two upright levers 338 (see Figs. 4, 8, 9 and 10). Extending between them at their upper ends and rigidly connected to them is a punch operating plate 154 against which abut the rear projections of the punch selectors and held in a rearward position by spring 156. Operating plate 154 is given a forward and backward movement by the operation of handle 2, as will be presently described, and this forces the punch selectors forward so that the nose of each selector strikes its appropriate punch 122 and forces it through any card that may be in "in" slot 1ª. If the card is in the "out" slot it is so far to the left that it is not opposite the punches at all, although the punches are operated on this "out" operation of the machine no work is done by them. To force plate 154 to the left, as viewed in Fig. 4, I preferably employ a toggle-lever arrangement, of which 153 is one part and 151 is the other. Part 153 consists of two arms, each pivoted at 155 to each of the upright levers 338. Part 151 consists of two arms freely pivoted on shaft 50 and at their other ends pivoted at 457 to the arms 153. This whole arrangement constitutes a toggle frame for forcing plate 154 forward. The toggle is operated through a link 143 secured to part 151 at 152. Link 143 is secured at its lower end 139 to arm 138 which operates the printing mechanism which will be presently described. At every operation of handle 2, arm 138 is rotated to the left and downward, as viewed in Fig. 4, pulling link 143 downward, straightening out the toggle, forcing plate 154 and the heads of the punch selectors to the left and driving those punches that stand opposite the noses of the selectors through the card, punching the time identification holes therein. Arm 138 is loose on shaft 182 and has at one end a cam roller 163 bearing upon the face of cam 168 fast on main shaft 32. Toward the end of the forward movement of main shaft 32, cam 168 rocks lever 138.

Levers 124 are operated in unison with plate 154 by means of a link 164 pivoted at 165 to one of the levers 338 and pivoted at its other end to one of the levers 124. Levers 124 are fast to shaft 202 loosely mounted in the side frames of the machine. The function of levers 124 is to press against collars 123 in the return movement and to return the punches to their original position.

On a first or "in" operation of a machine by a workman the punches will be operated and holes will be punched in the card indicating by their location thereon the time of such operation. At the same time the time-of-day type-wheels will be moved to position in accordance with the time-of-day cams representing the true time and they will print upon the card that time. In this operation the elapsed time type-wheels will be moved in the adding direction in accordance with the then condition of the elapsed time timing cams and the subtracting racks will fall their entire distance. This movement of the elapsed time type-wheels and the subtracting racks will not accomplish any work, however, as the printing hammer opposite the elapsed time type-wheels will in this position of the parts be inoperative as will be presently described.

On the "out" or second operation of the machine by a workman, as at the completion of a job, he takes his card, upon which at the first operation of the machine by him there had been printed the "in" time or the time of the commencement of the job in the "in" space 620 on the card and in which card at the same time there had been punched the four time holes 619, 618, 617 and 616 representing the same time in tens-of-hours, hours, tens-of-minutes and minutes as were then represented by the then condition of the corresponding elapsed time timing cams, and inserts it in the "out" slot. This brings the card a little to the left of its former position, when in the "in" slot, and so that none of the card is now opposite the punches 122 and so that the time holes 619—616 are now opposite four series of pins 209, 377, 378 and 378', representing respectively the pins for the minutes, tens-of-minutes, hours and tens-of-hours denominations of time. The workman then pulls forward handle two as before. As before this causes the time-of-day type-wheels to be moved to a position corresponding with the position of their time-of-day cams so that there will stand upon the printing line type representing the time of the second or "out" operation. It also causes the elapsed time type-wheels to be moved in their adding direction to a position to correspond with the then condition or position of the elapsed time timing cams and also causes the punch selectors to be moved to a similar position, as before. It also, near the commencement of the movement of handle 2, causes the pin boxes with the four sets of pins to be moved forward so that each series of pins is brought into contact with the card, whereupon the pins in register with the time identification holes previously punched in the card, will pass through such holes and project into the paths of the corresponding subtracting racks. It will also release the subtracting racks and permit them to fall, thus moving the differentials in the reverse or subtracting direction and moving the elapsed time type-wheels in the reverse or subtracting direction. These subtracting racks, however, instead of falling their entire distance, as in the first or "in" operation, will fall only until stopped by the four projecting pins. As these pins are projecting through the time identification holes, whose location upon the card corresponded with the condition of the elapsed time timing cams at the first or in operation of the machine by the workman, the movement of each subtracting rack will depend in its extent upon the then condition of the elapsed time timing cams, i. e. the condition of the timing cams at the time of the first operation, and thus the subtracting racks will move the differentials and the elapsed time type-wheels in the reverse or subtracting direction a distance corresponding to the time represented by the condition of the elapsed time timing cams at the first or "in" operation, or in other words, will subtract the time of such "in" operation as thus represented from the time of the "out" operation as represented by the condition of the elapsed time timing cams at the second operation. This will cause to be brought upon the printing line of the elapsed time type-wheels type representing the difference in working hours between the first operation and the second operation, or in other words, the elapsed time in working hours between the said two operations. The further operation of the handle will cause the printing of this time upon the card in the space 622 and will cause the printing of the time of the second or "out" operation in the space 621 of the card. While the punch selectors will operate punches at this operation, no work will be accomplished by them as no part of the card is opposite the punches. I will now describe in detail the subtracting mechanism including the sets of identifying pins for controlling the subtracting mechanism.

*The subtracting mechanism including the pins, subtractor racks and connections.*—These are specially illustrated in Figs. 5, 6, 8, 9, 10, 11, 15, 16, 17 and 55. The elapsed time type-wheels are controlled in their reverse or subtracting movement by means of records of a previous operation of the machine as marked upon the card, these records, as shown in the particular machine illustrated, being in the form of time identification holes punched in the card. This control, in the machine shown, is affected through pin boxes, each comprising a series of pins representing different units of a denomination of time, which boxes are mounted so as to be moved toward and away from the card, so that any pin corresponding or registering with a hole in the card will project through it into the path of one of the subtractor racks and thereby influence the extent of movement of that rack and thereby affect the extent of the subtracting movement imparted to the corresponding typewheel. Referring now to the specific mechanism shown, a pin box is arranged for each row of holes punched in the record card. One of these pin boxes is shown in Figs. 5 and 6. As all the pin boxes and their connecting mechanism are substantially the same, I will describe the one shown in Figs. 5 and 6, viz.. the minute pin box, in detail, it being understood that a similar pin box is provided for the tens-of-minutes, another for the hours and another for the tens-of-hours. Referring to the minutes pin box, it is mounted at the top of a movable lever 203 loosely mounted on a rod 175 fast in the side frames of the machine. This lever carries at its upper end two struts 211 and 212, and together form a frame or box to hold the pins 209. There are ten of these pins and each one of them provided with a collar 261 and a compression spring 210. The normal position of the parts is that shown in Fig. 5. The supporting levers for the other pin boxes are 346 for the tens-of-minutes, 347 for the hours and 292 for the tens-of-hours. These pin boxes and their levers are adapted to be moved toward and away from the card in the slots 1 and 1ª. The mechanism for this purpose consists of a piece 214, loosely mounted upon rod 175 and fast with an arm 227, carrying at its other end a cam roller 228 bearing upon the surface of cam 230 fast on shaft 32. Piece 214 is provided at its upper end with a rod 213, which passes through an aperture in all of the pin boxes supporting levers 203, 346, 347 and 292. Pieces 214 and 227 are connected by a bushing on rod 175 (Fig. 10) to which bushing both of them are secured. The parts are shown in their normal position in Fig. 5. It will be seen that the first movement of shaft 32 and cam 230 will cause piece 214 to be moved toward the right, as viewed in Fig. 5 and through rod 213 it will move all of the pin boxes to the right against any card that may be in the card slot. This position of the parts is shown in Fig. 6. In the first operation of the machine, in which an unpunched card has been inserted in the slot 1ª, the pins will be stopped by the card and will not pass through the openings 335 in the guide plate 260 (Fig. 55). Accordingly in this operation the pins will simply rest idly against the card and will do no work. But in a second operation by the workman, where a card is inserted which has had holes punched in it in a previous operation, those pins which register with the punched holes in the card will pass through such holes and through the corresponding holes in guide plate 260 and will project beyond it as shown in Figs. 6, 15 and 16. In this position they will lie in the path of a shoulder or shelf 206 of the corresponding subtractor rack. In Fig. 6 the shoulder 206 of the minute subtractor rack 205 is shown as stopped by resting upon the next to the lowest pin 209. As previously stated a subtractor rack is provided for each of the elapsed time type-wheels, the rack for the minute time type-wheel being 205, that for the tens-of-minutes being 279, that for the hours 280 and for the tens-of-hours 332 (Fig. 8). These racks in their normal or zero position are at the upper end of their stroke as shown in Fig. 5. Each rack is provided with a set of gear teeth 481, see Fig. 5, which mesh with a corresponding differential gear, the set shown in Fig. 5 meshing with differential gear 238. The differential gears are as follows; 238 for the minutes, 476 for the tens-of-minutes, 482 for the hours and 485 for the tens-of-hours. Each subtractor rack is provided with two vertical slots 507 and 508 and through all of these pass guide rods 218 and 222 secured to the side frames of the machine to guide the subtractor racks in their vertical movement and to limit that movement.

The subtractor racks are normally in their uppermost position. At each operation of the machine they are permitted to drop the entire length of the slots 507 and 508, by devices presently to be described, unless it should strike a pin 209 projecting through a hole in the card. In this downward movement they turn the differential gears 238, etc., to the left as viewed in Fig. 5 and tend to cause those gears to roll downward on the teeth 476 of racks 235, 359, 360 and 314 respectively. This motion is imparted through the differential racks 220, 281, 282 and 283 respectively through pinions 244, 361, 362 and 333 fast to the elapsed time type-wheels 245, 420, 421 and 423 respectively, causing those wheels to be moved clockwise as viewed in Fig. 5. If no pins are projecting into the paths of the subtractor racks, as in a first operation of the machine, this movement will turn the elapsed time type-wheels one-half a revolution and as two complete sets of type are arranged on the periphery of each of these type-wheels, this downward movement of the subtractor racks has the effect of simply bringing exactly the same type upon the reverse side of the wheel onto the printing line, thus not affecting the type on the printing line in any way. Such movement of the subtractor racks in the first or "in" operation of the machine does no useful work whatever. But where as is always the case on a second or "out" operation, a pin projects through the card into the path of the shoulder of the corresponding subtractor rack, it will limit the downward movement of such rack to an extent representing the time represented by the particular hole in the card through which such pin projects. This will move the corresponding type-wheel into a direction reverse to that in which it was moved by its corresponding rack 235, etc., and thus subtract from the total or added time represented by the position of the type-wheel as moved through its rack 235, the number of units of the same subdivision of time represented by the corresponding hole in the time card, the effect being to bring upon the printing line that type of the elapsed time type-wheel which represents the difference in that denomination of time between the condition of the corresponding timing cam at the second operation and its condition at the first operation. This type will, therefore, represent the elapsed time between the two conditions of the timing cams and this time will be printed upon the time card toward the close of the second operation of the machine.

In the normal position of the gears the differential gears 238, etc., are, it will be understood, standing at the neutral or zero position. The movement of the racks 235, etc., controlled by the position of the timing cams at the second operation will tend to cause the differential gears and their differential racks to move upward a corresponding distance and to rotate their elapsed time type-wheels in the adding direction a corresponding distance and to, therefore, represent the then condition of the timing cams, i. e., their condition at the second operation, and the subsequent operation of the subtractor racks 205, etc., in their subtracting operation will tend to cause the differential gears and their racks to move downwardly a distance corresponding with the hole punched in the card, or in other words, to move downwardly a distance corresponding with the condition of the elapsed time timing cams at the first operation of the machine. This will, of course, tend to move the type-wheels backward or in the subtracting direction a corresponding distance. The resultant condition of the respective type-wheels will then represent the elapsed time between the two operations, as represented by the difference between the two conditions of the elapsed time timing cams. As these timing cams are not driven all of the time, as has been already described, but are driven only during certain specified intervals, viz., intervals of working time, the elapsed time will represent not the actual time that has elapsed between the time of the first operation and the time of the second operation, but will represent the elapsed time of the working hours between those two periods of time.

In the operation of the machine shown, the adding operation and the subtracting operation are performed upon the differentials and the elapsed time type-wheels simultaneously. If desired the two operations may take place successively. But in either case, it will be understood, the effect of the operation upon the differential gears and their elapsed time type-wheels will be the same. When as in the present case, the two operations occur simultaneously, any differential gear will remain stationary until either the upward movement of its adding rack or the downward movement of its subtracting rack has been concluded and it will then be moved upward or downward during the remaining movement of the other part. It will be seen that the result is the same whether these two operations of adding and subtracting are performed successively or simultaneously. In case any differential gear goes below its normal or zero position it will, of course, be necessary to borrow one from the elapsed time type-wheel of the next higher order. The mechanism for performing this will be presently described. In order to keep roller 228 and arm 227 in contact with cam 230, a tension spring 226 is attached to piece 214 and at its other end to a tie rod 178 secured to the frame work. In order to permit the subtractor racks 205, etc., to fall at the proper time and at other times to be held in their proper position, I provide a lever connected with the differential gears, loosely mounted on shaft 172 and normally held in its upper position by a rod 264. In Fig. 5 this lever for the minute differential is 237. It is pivoted on rivet 239 of that differential, a slot 240 being provided to permit of the free movement of the parts. The same parts for the other differential gears are as follows: viz., for the tens-of-minutes differential, 476, lever 340; for the hour differential 482, lever 339 and for tens-of-hours differential 485, lever 306. All of these levers are loosely mounted on shaft 172 and are held in their normal position by rod 264. Rod 264 is secured to lever 262. A spring 229 is secured to lever 237 and corresponding springs (not shown) are secured to the other corresponding levers respectively. These springs 229 are secured at their other end to tie rod 180. The purpose of these springs is to exert a strong downward pull on the levers and upon their corresponding differential gears and racks. As soon as the machine starts, cam 231 rotates and allows roller 263 on the other arm of lever 262 to move inward toward shaft 32. This permits bell crank lever 262 to turn on its shaft and allows the universal bar 264 to move downward and, therefore, permits the tension springs 229, etc., to tend to pull the differential gears and their racks downward. The other end of bar 264 is attached to lever 342 loosely pivoted on shaft 172. Thus while the addition is taking place upon the elapsed time type-wheels, rod 264 is being lowered and the differential gears and their racks are free to move downward under the weight of the subtractor racks and under the influence of springs 229, etc. The subtractor racks are moved downward by their own weight, assisted by the springs 229, etc., and in their downward movement they tend to carry with them the differential gears, the latter rolling down on the adding racks 235, etc., which latter are, of course, held in their position through their connections. Accordingly the subtracting racks move downward until stopped by pins or until they reach the limit of their downward movement, tending to take the differential gears and racks down with them and causing a subtracting operation to be performed upon the type-wheels.

Whenever a differential gear is dropped below its normal or zero position and the corresponding type-wheel has been rotated back of its normal or zero position, one must be borrowed from the type-wheel of the next higher order. Any suitable borrowing devices may be employed. I will now proceed to describe the device employed for this purpose. In order to permit the borrowing operation to take place I preferably cause the pin boxes, after they have been moved forward against the card in the first part of the operation of the machine, and after the subtractor racks have fallen and have been caught by the projecting pins, to move backward slightly so as to remove the projecting pin from contact with the projection 206 with which it is engaged in order to permit the subtractor rack to move one point downward. I also provide each subtractor rack of a denomination higher than the lowest, namely the subtractor racks for the tens-of-minutes, hours and tens-of-hours, with a projection or notch or shelf 374, as shown in Figs. 15 and 16. This shelf is made to the left and one point higher than shelf 206. Accordingly, when the pin box is moved slightly backward, the projecting pin will clear shelf 206 permitting the rack to fall further but it will still lie in the path of shelf 374 and permit the subtractor rack to fall but one point further. Accordingly the subtractor rack falls this additional point and rotates the differential gear and its elapsed time type-wheel one point further in the subtracting operation thus borrowing one from such type-wheel. In the devices shown this is accomplished by the following mechanism: Cam 230 is slightly cut away at its right hand end, as viewed in Fig. 5, and a light spring 225 is secured to each pin box support, 203, etc. Accordingly after the subtracting racks have fallen and been stopped by the pins engaging shoulders 206, roller 228 will go forward slightly in the cut away part of cam 230, permitting piece 214 to slightly fall back to the left, as viewed in Fig. 5, carrying with it rod 213. This permits those of the pin supporting levers 203, etc., which are not held in their forward position by means to be described, to go back a short distance sufficient to enable the pins to clear the first shelf 206 and to lie in the path of the second shelf 374. To prevent those of the pin boxes from going backward where borrowing is not desired, I provide a series of catch levers to hold them in their forward position. The catch lever for tens-of-minutes support 346 is shown in Fig. 6 as 268 loosely mounted on rod 217. Similar catch levers are provided for the other supports, 519 for the hours, and 519′ for the tens-of-hours, each adapted to catch the pin box support of the next higher column. Each catch is adapted to engage and catch 243, 502 and 510 respectively, secured to the corresponding pin box support, see Figs. 6, 15 and 16. A light spring tends to hold these catches in engagement. These springs are numbered 242 and 520. When the pin box supports are moved forward, as they are in the first part of the operation, and as viewed in Figs. 6 and 15, these catches engage and hold the supports and their pin boxes to the right. Whenever any differential gear falls below the normal or zero position, the corresponding catch is released. This is accomplished by means of a pin projecting from the differential gear support 479 of the differential adapted to engage the cam surface at the right hand lower end of the latch. In Fig. 15 the pin is shown as 341 and the cam surface as 521. Spring 242 and the other springs are secured to a rod 215. The corresponding parts for the different cam supports are as follows: for tens-of-minutes pin box support 346, catch 243, catch lever 268 with its spring 242, cam surface 241, and differential pin 273 of the minutes differential support for hour pin box support, catch 502, catch lever 519 with its spring 520 and cam surface 521, and differential pin 341 of the tens-of-minutes differential support, tens-of-hours support 292 with its catch 510, catch lever 519′ with its spring 520 and cam surface 521, and differential pin 469 on the hour differential support.

When any differential goes below its zero position its pin will tip the corresponding lever and release the corresponding catches and the pin support will fall backward slightly to the left. In order to permit this slight backward movement of one or more of the pin supports while the others are still held in their forward or right hand position as viewed in Fig. 6, the opening in the pin box supports, through which rod 213 passes, is made slightly larger than the rod, as shown in Figs. 15 and 16. Fig. 15 illustrates the catches in position and Fig. 16 illustrates them as released with the pin box in its operating position. In the latter operation one is borrowed from the type-wheel of the next higher order. It will be understood that each differential pin affects only the lever and pin box support of the next higher order. Of course, on the lowest or tenth subtractor rack only one notch is provided as shown in Fig. 6. The slot in the pin supports is only just large enough to permit the pin supports to fall backward just enough to permit the projecting pin to clear the lower shelf 206 but not enough to permit it to clear the upper shelf 374 of its subtractor rack.

As the pin boxes go forward on the first movement the catch levers 268, 519 and 519′ are moved into operative or catching position, the means for this as shown, consist of a link 302 (see Figs. 5 and 6) pivoted at 304 to arm 342 and at its other end pivoted at 303 to plate 331, which is freely pivoted on rod 217. A similar plate 331 is also freely pivoted on the same shaft 217 and the two are connected together by a universal rod 216. The catch levers rest against this rod 216 and are normally held upward out of engagement with the catches on the pin box supports and are lowered down into engagement at the proper time.

When universal bar 264 drops, it turns bar 216 downward, permitting the engagement of the catches. They are now in position for the borrowing operation whenever it becomes necessary. Toward the close of the operation of the machine, when bar 264 is moved back to its normal position, bar 216 also moves to the left, as shown in Fig. 5 and lifts the catch levers 268, etc., out of engagement, permitting the pin box supports and their pin boxes to drop back into their original positions.

The pin box for use in the tens-of-minutes column is illustrated in Fig. 17. 346 is the support, 381 the supporting struts, 377 the pins, which here are six in number, 379 their springs, 380 their collars and 369 an upwardly projecting guide working in slot in plate 67.

*Impulse mechanism.*—This is specially illustrated in Figs. 1, 3, 8, 9, 10, 21, 22, 23, 24, 25 and 26. Any suitable impulse mechanism may be employed. I will now proceed to describe that shown in the drawings. This impulse mechanism is actuated by means of the reciprocation of handle 2. It rocks main driving shaft 32 and through it operates various parts of the mechanism. It is arranged so that in the earlier part of the operation, motion will be transmitted from handle 2 to the main driving shaft in a yielding or flexible manner in order to perform the lighter and more delicate operations such as moving the time-of-day typewheels and the elapsed time type-wheels to their proper positions to correspond to the condition of the timing cams and to move the punch selectors to a corresponding position and in the latter part of the operation to transmit such motion in a rigid manner to perform the heavier or less delicate operations such as the actual printing or punching. In the earlier part motion is transmitted through springs 93, 93 and in the latter part by a rigid connection to be described. The details are as follows: Handle 2 is fastened to a short shaft 5 mounted in housing 4 (Figs. 1 and 3). Fast on shaft 5 is pinion 72 meshing with toothed sector 73 pivoted at 74 (Figs. 21 and 22) between side frame 68 and bracket 75. 81 is an arm integral with sector 73 and has connected to it at 82 four tension springs 93, 93, 92 and 408. The ends of springs 92 and 408 are fastened to anchorage pieces 120 which are fastened to stud 96, secured in the side frame 68 and arm 81. These two springs merely serve to return arm 81 and its connecting parts, including handle 2, to their original positions on the close of the operation. The two springs 93 are secured at their lower ends to a casting 95 fast on main driving shaft 32 at 409 and at their upper ends to an anchorage 414, 415 secured to arm 81, see Figs. 25 and 26. The object of these springs is to impart movement to the main driving shaft upon which are situated the various cams which drive different parts of the mechanism.

In the operation of the machine handle 2 is pulled forward, as shown in Fig. 1, rotating pinions 72, sector 73 and arm 81 as indicated by the arrow in Fig. 3, stretching all of the springs and through the two springs 93 tending to rock shaft 32 as shown by the arrow in Fig. 3. I preferably provide retarding means to prevent a too sudden operation of the parts through handle 2. For this purpose casting 95 has an arm 94 integral with it pivoted at 118 to the casing of dashpot 115 and tending to pull the casing downward and with it piston rod 111 fastened to it, as shaft 32 rocks. Piston rod 111 is pivoted at 108 to the side frame 68 and carries at its lower end, piston 470 provided with two holes 116 and 117, one of these holes 116 has a valve 114 which opens the hole on the forward stroke of handle 2 and closes it upon the return stroke, thus slightly varying the cushioning effect in the two cases. 113 is an umbrella to prevent the oil from impinging too strongly upon the inside of cover 112 to prevent leakage. 119 is a small pin provided to keep valve 114 in place. The effect of the dashpot is to retard the movement of shaft 32 and prevent excessive speed on either the forward or return movement of the parts and thus avoid sudden jars and shocks and to cause the mechanism to run more smoothly. When handle 2 is turned forward motion is imparted to shaft 32 only through springs 93, thus giving a yielding or flexible connection in the early part of the movement. The lever 95 of the dashpot shaft 32 cannot respond to this pull faster than at a certain prescribed rate. It will be understood that handle 2, including arm 81, may at first move more rapidly than casting 95 and shaft 32, springs 93 being stretched in this operation. The latter will, of course, in time retract and cause casting 95 to overtake the movement of arm 81.

When the lighter operations have been performed and the heavier work, such as the printing or the punching, is to be performed a rigid connection between the operating means and the shaft 32 is provided by means of the following mechanism: Connecting arm 81 with casting 95 is a link 83 pivoted at 97 to the casting and provided at its other end with a slot 86 through which projects pin 87 from arm 81. Pivoted to pin 87 at the point 410 is hook piece 88 having at its lower end a hook 412 on one side and a hook 411 on the other and resting against pin 89 mounted on the side frame and held in approximate position by spring 90 mounted on link 83 and resting in the depression 413 at the bottom of 88. 91 is a block fast on the back of link 83, indicated in dotted lines in Fig. 3 and shown in full lines in Fig. 23. Fig. 23 is a section on the lines 23, 23 of Fig. 3 and shows the crossovers and springs 93, 93, 92 and 408 and also the hook piece 88, link 83 and block 91. In the first upward movement of arm 81 pin 87 slipping loosely in slot 86 exerts no upward pull on link 83. Hook piece 88, however, is pulled upward by arm 81 until hook 412 engages a projecting pin 84 (Fig. 22), secured to the frame work. The angular relation of hook piece 88 and pin 84 is such that hook 412 would be forced off pin 84 but for the fact that hook piece 88 which is in the same plane as block 91, is against block 91. In this position of the parts the upward movement of arm 81 and hook piece 88 is momentarily arrested. Shortly thereafter, however, springs 93 pull forward casting 95 and with it link 83 until the lower part of block 91 passes hook 411, whereupon hook piece 88 is forced to the right, as viewed in Figs. 3 and 21, and hook 411 catches under the lower left hand corner of block 91. A further upward movement of arm 81 causes casting 95 to rise upward, further rocking shaft 32 and thus movement is transmitted, not through the springs, but through the rigid connection consisting of hook piece 88, hook 411, block 91 and link 83. The connection is now a rigid one and the further rocking of shaft 32 by handle 2 is accomplished through this rigid connection. It is during this rigid connection that the heavier parts of the work are performed, such as the printing and the punching. At the close of the operation springs 92 and 408 return arm 81 and its connecting parts, including handle 2, to their original positions and this movement through link 83 returns casting 95 and shaft 32 and their connections to their original positions.

*Printing mechanism.*—This is particularly illustrated in Figs. 4, 5, 6, 7, 9, 11, 33, 34 and 35. It consists of two pressure printing pads 137 and 318, pad 137 printing the elapsed time records and 318 printing the time-of-day records. Referring to the printing pad 318, this pad stands opposite the time-of-day printing wheels 365, 424, 422 and 148 and prints the time-of-day at every operation of the handle 2. This is accomplished by a fork lever 316, Fig. 7, which has meshing with it a round nose of a projecting end of operating lever 315 fast on shaft 202. Shaft 202 rocks every time that punching mechanism works and so every time that machine is operated. Printing pad 318 mounted on the end of 293 is adjusted relatively to lever 132 by means of an eccentric similar to 135 (Fig. 33), fast on the arm of the printing pad, revolved by screw 317. Eccentric 135 has a worm wheel 496 (Fig. 35) cut on its surface engaging with the screw threads of screw 317. Lever 316 is loosely mounted on stationary shaft 133. By turning screw 136 the printing hammer is adjusted. On every operation of the handle lever 315 is moved and printing pad 318 is forced against the inking ribbon, card and time-of-day type wheels, printing the time-of-day upon the space of the card then opposite the hammer of the printing wheels.

Hammer 137 is connected so as to be operated only on the "out" or second operation of the machine and for this means a cut-out mechanism or clutch is provided in the connections between the lever 138 and the printing pad 137. The particular mechanism for this purpose is as follows: 142 is a shaft extending from side frame 66 to side frame 68 and carrying on it near its left end as viewed in Fig. 11 a boss 633 which has fast to it at one end the detector arm 319 (Fig. 7) and on its other end the short lever arm 627. This latter arm has pivoted at its upper end a link 626 pivoted to it at 628. In the early part of the operation of this machine this link has a tension put upon it tending to pull it to the right as viewed in Fig. 7 and thus causes the detector arm 319 to move forward and to pass through the detector slot if it encounters no card in the slot. This tension is produced by means of the spring 631 which is secured to the stud 632 which is mounted on the bar 302. Its other end is attached to the sliding bar 626 which is loosely mounted on the piece 302, which actuates the universal bar 216 of the subtractor mechanism by the stud 629 (see Fig. 10). 626 is attached at its other end to the lever arm 627. As a result of this when the plate 342 moves and the detector 319 encounters a card which has been inserted in either one of the card slots the spring 631 takes up the motion as plate 342 moves at every operation of the machine while the detector 319 can only move a portion of its full stroke if a card has been inserted in the slot. If it encounters a card as it will in the "in" operation, the arm will be held back and will not operate the catch to connect lever 138 with printing pad 137. If, however, it does not encounter a card as it will on the second or "out" operation, because in the "out" operation a detent in the card, shown at 623 in Figs. 60 and 61, will then be opposite the end of the detector arm 319 and will permit that arm to pass through the slot. The clutch is particularly illustrated in Figs. 4 and 9 and consists of a pawl 301 loosely pivoted at 544 to lever 307 which is fast to printing pad 137 through a similar adjusting device already described with reference to pad 318, namely parts 136, worm 496 and rod 135 shown in Figs. 33, 34 and 35. 141 is an arm fast on shaft 142 and carries at its upper end a pin 140 which has resting against it the tail of clutch pawl 301. A tension spring 303 fast to lever 307 and to the pawl tends to draw the pawl to the right as viewed in Fig. 4 and holds it against pin 140. Normally pin 140 holds the clutch out of engagement with an arm 304 having at its upper end pin 305 engaging slot arm 132. When shaft 142 rocks to the right it permits clutch 301 to move to the right until its tooth engages with the end of arm 304. This operation takes place only when the upper end of detector arm 319 is permitted by detent 623 to move into the slot and this, as already described only takes place on the out operation of the machine. When this occurs lever 138 through slotted arm 132, pin 305 and arm 304 forces pawl 301 to the left as viewed in Fig. 4 and acting through arm 307, and pin 135 forces printing pad 137 against the ink ribbon, card and elapsed time type-wheels, printing the elapsed time upon the card. At all other times the rocking movement of slotted arms 132 and 304 has no effect on printing pad 137 as clutch 301 is then out of engagement with arm 304. It will be understood, of course, that clutch 301, arm 307 and printing pad 137 are loosely mounted on shaft 133.

By the above means the clutch is normally out of clutching connection and the printing pad 137 is inoperative. It only becomes operative when detent 623 is opposite the end of detector arm 319 and this occurs only on the "out" operation. Accordingly the type on the elapsed time type-wheels will never print except on the "out" operation.

*Ink ribbon mechanism.*—This is specially illustrated in Figs. 2, 3, 9, 10, and 11. It consists of the ordinary ribbon spools mounted on studs and fed forward by ratchet wheels. One of these spools 42 is shown in Fig. 2. 41 is the ratchet wheel for feeding it forward. The spool is mounted on stud 43. 37 is a click pawl mounted on stud 497 provided with a tail 38 which rests against the lower edge of feeding pawl 34. This feeding pawl is mounted on the upper end of lever 35 and has a downwardly projecting tail 512 connected by a tension spring 39 with a tail 511 of a click pawl 37. Lever 35 is fast at 36 as is also a feeding lever 31. Pawl 34 has an elongation 40 to engage the shifting mechanism, presently to be described. Lever 31 has a slot 33 in its upper end so shaped that when pin 30, fast to arm 29, secured to main driving shaft 32, is rocked by the shaft, lever 31 will be moved forward or to the right as shown in Fig. 2, during the first part of the stroke and will then remain stationary while pin 30 completes its travel in the uppermost part of slot 33, owing to the inclination of that slot to the left as shown in Fig. 2. The other support 105 as shown in Fig. 3, is mounted on stud 107 and has ratchet 106. 101 is a click pawl, 102 its surface bearing on feeding pawl 98, the latter having elongation 104 and being pivoted to lever 100 at 99, lever 100 being fast on shaft 36. 98 has a tail 514 provided with a spring 103 connecting it to tail 513 of click pawl 101. These parts are similar in all respects to those already described with reference to spool 42.

The ribbon shifting mechanism is best shown in Fig. 11. Plate 183 is secured to both of the side frames 66 and 68. Lever 186 is freely pivoted to it at 184. This lever tilts from one side to the other as occasion may require and moves one of the feeding pawls above described into engagement with its ratchet and removes the other from engagement with its ratchet or vice versa. Fast on plate 183 is a spring 189 adapted to engage with any one of three pins 190. The inside of the spring is so shaped that it presses inward against pins 190 and between them and tends to keep lever 186 in either one of the two positions into which it may be moved. Another lever 187 is pivoted to plate 183 at 185. This lever is bent up at its ends so as to form two slender forks 197 at one end and 195 at the other, these forks straddling the ink ribbon 44 as shown. A roller 191 is pivoted at 193 to lever 187. The pivot 193 is very small and is many times smaller than the opening or hole in the center of 191. A flat spring 192 is fastened to the side frame 68 and is provided with a V-shaped end. An opening 194 is provided in plate 183 large enough to allow of considerable movement of lever 187 on plate 183 and large enough to permit the insertion of the roller 191 and its connecting parts. A loop 201 is sewed in the ink ribbon at each end a short distance therefrom, as shown at the left in Fig. 11. This loop is unable to pass between the forks 197, and the forks 195, as these forks are close together. As the ribbon is fed this loop will engage one of the forks, for example fork 197 and will gradually force, in this case, the left hand end of lever 187 upward and the right hand end downward. When it has moved lever 187 a sufficient distance roller 191 will suddenly jump over the V-shaped lower end of spring 192 and will cause the left hand end of lever 187 to strike a sharp blow on knob 199 of lever 186. This will suddenly throw this lever into its other position and will accordingly throw one feeding spool into operation and the other out of operation, thus reversing the feeding of the inking ribbon. On the right hand end of lever 186 the knob is marked 200 and corresponds with knob 199. 343 and 344 are compression springs which are used to exert pressure between the sides of the ink ribbon spools and the collar fast to the end of the shaft on which they rotate in order to keep a tension on the ribbon. 198 and 196 are rearwardly extending projections which engage ends 40 and 104 of the feeding pawls. 85 is a guide and 345 a guide and guard for the ink ribbon 44 to protect it from the card, specially when the card is in the "out" position. In order to guide the pin boxes in their movement toward and away from the card slots I preferably provide grooves 498 in a flat plate 67 (Figs. 5, 6 and 8). Plate 67 is fastened to side frames 66 and 68. Upon the top of each of the pin box struts 287', 376', 370' and 211' are projecting guides 286, 375, 369 and 204 respectively, the projections moving in the slots and guiding the pin boxes. Plate 67 also carries the card guides 466, 466.

The method of fastening the cover of the casing is illustrated in Figs. 2, 3 and 8. There are four downwardly projecting lugs extending from the top plate 3, two in front numbered 46 and 76 and two in the rear numbered 48 and 109. These depend in such a position as to be adjacent to the outside of the side frames and the side frames are attached to these lugs by screws, 45, 77, 49 and 110, so that the machine is supported by the top plate 3 which has its edges resting on the table or other support.

*Cut-out mechanism for disconnecting and connecting the elapsed time timing cams with their driving means.*—This is specially illustrated in Figs. 8, 18, 19 and 20. 269 is the minute actuating pawl of the minute ratchet wheel 266. This pawl has a pin projecting sidewise from it. The normal position of this pin is that of the dotted lines 522 shown in Fig. 20. In this position it engages the teeth of ratchet 266 and at every actuation of the frame 382 as already described the pawl rises and feeds ratchet wheel 266 and with it elapsed time minute cam 254. This is the position of the parts during working hours and while the pawl and pin are in this position all of the elapsed time timing cams are fed forward. They are in this position from the time that contact 587 on disk 584 passes contact arms 586 and 635, until contact piece 588 closes the contact between 636 and 586 as already described. Immediately at the end of the next operation of pawl 269 cam 536 snaps beneath pin 522 when in its uppermost position and when this pin is moved downwardly with its pawl it rides outside and upon the exterior surface of cam 536. In Fig. 20 it is shown in its position by the left dotted lines 522. On each succeeding actuation of pawl 269 pin 522 rides upward and downward on cam 536, thus keeping the pawl out of engagement with its ratchet wheel 266. During this time the projection 392 on the pawls of higher denomination keep all of those pawls out of engagement with their respective ratchet wheels so that none of the elapsed time timing cams are fed forward. This lasts until the next contact piece 588 on disk 584 restores pin 522 to its original position, whereupon pawl 269 and the other pawls of higher denominations begin again to feed their respective ratchets and the timing cams are again fed forward. When contact piece 589 on disk 584 makes contact with contact pieces 586 and 635 pin 522 is again outside of cam 536 and no feeding takes place until the contact piece 587 again operates contact pieces 586 and 633. The means for throwing the pin 522 into the one or the other of these two positions is shown in Figs. 18, 19 and 20 and is as follows: It consists of an electro-magnet 523 which is supported by the bent metal piece 538 which encircles the shaft 50 upon which the cams of the time-of-day mechanism are located. The piece 538 is bent out so as to form bearings 526 in the ears 527 for the armature 524. The armature is kept from the magnet by the tension spring 529. Armature 524 is pivoted at 526 to the frame 527. This spring 529 is fastened at its other end to lever 530 which is provided with a cam wiper 531 and carries at its other end cam surface 536. Lever 530 is pivoted at 537 to the stationary piece 538 and has a cam part 536 that at times engages the pin 522 as described. Also fast to the armature 524 is a pawl 542 pivoted at 528 and having a tension spring 541 to hold the top of the pawl in contact with the ratchet 534. A stud 535 is securely fastened to the sheet metal supporting member 527 for the nose of the pawl 542 to engage with and thus prevent overthrow. The ratchet 534 is fastened to the cam wheel 532 and they are loosely mounted on the stud 533 which is fastened to the supporting member 527 as shown. A click pawl 543 is pivoted at 539 to engage the ratchet 534 and is kept in that position by the tension spring 541 secured to it at 540 to prevent backward rotation. A stop pin 525 is arranged to keep the armature in position. As will be seen from Fig. 18 there are twice as many teeth in the ratchet 534 as there are rises on the cam 532, consequently every time the magnet 523 operates the pawl 542 feeds the ratchet 534 forward one tooth and the lever arm 530 is alternately left on a rise or opposite a depression of the cam 532. When magnet 523 is thus energized, with pawl 269 and its pin 522 in their normal position, that is with the pawl in engagement with its ratchet 266, and cam wiper 531 comes opposite to a depression in cam wheel 532 the cam wiper cannot move down into the depression because the side of its cam surface 536 rests against the end of pin 522 and holds the lever 530 in the position shown in Fig. 18. But on the next upward movement of pawl 269 and pin 522, the pin 522 rises above the sloping surface of cam 536, whereupon lever 530 is pulled by spring 529 so that cam wiper 531 moves downward into a depression of cam 532 and the upper sloping surface of cam 536 moves under pin 522. At the next downward movement of pin 522 and its pawl 269 the pin rides on the outer surface of cam 536 as already described and continues to ride on it in its upward and downward movement, thus keeping pawl 269 and the pawls of the higher wheels out of engagement with their respective ratchets until the next contact piece on disk 584 energizes magnet 523, whereupon cam wiper 531 of lever 530 is pushed downward onto a rise of the cam and cam 536 is swung to the side of pin 522. Thereupon spring 271 of pawl 269 throws the pawl and pin into their right hand position shown in Fig. 20, thus throwing that pawl and the pawls of the higher timing cams into engagement with their respective ratchet wheels. The timing cams are then fed on until pin 522 again throws the pawls out of engagement in the manner already described.

The electrical connection between the case and the machine I will now describe. This connection is for the purpose of enabling the machine to be taken out of its case or box and be put back again or another machine be put into the same box without the necessity of any wiring. Mounted on the case 7 are three binding posts 300, 294 and 299 (Figs. 9 and 14). Time-of-day wire 609 is connected with binding post 300, common wire 610 with 294 and the cut-out mechanism wire 611 with 299. Insulating block 10 is fast upon the binding posts and binding post 300 has fastened to it contact plate 298 and binding post 294 has fast to it contact plate 11 and 299 has fast to it contact plate 297. Contact plate 298 is on the inside of cheek 296 of block 10 and 297 is on the inside of the other cheek 296 of plate 10. All of the above parts form one integral structure and are mounted on the casing 7. 295 is an insulating block fast to the side casing 66 of the mechanism of the machine and is fastened to it by screws 27. This piece carries on it top contact plate 28 adapted to rest upon and make contact with plate 11. 642 is a contact plate fastened on one side of block 295 and resting against and making contact with time-of-day plate 298. 12 is a contact plate fastened to the other side of block 641 and resting against and making contact with cut-out-plate 297. Block 295 and contact plates 642 and 12 and 28 are all fastened together and to the side wall 66. The three contact plates 642, 12 and 28 are connected with their respective wires. When the mechanism of an indicating machine is put into its case or taken out, block 295 and its contacts slip into position in the interior space left for them in block 10, the contact plates rest against their respective plates. Screws 448 hold them firmly in position. Window 6 is placed in a round window frame 641, preferably held in locked position by means of a locking device (not shown) of which 404 is the key hole. Immediately beneath the window 6 are the time-of-day indicating wheels 404 the minutes, 405 the tens-of-minutes, 406 the hours and 407 the "A. M." and "P. M." This construction not only enables the time to be seen but it also affords a ready access to the time-of-day indicating wheels and their cams, so that if necessary, these may be set at the true time without taking the machine out of the case.

In Figs. 1 and 47 I have shown means for fastening the machine to a table or desk or shelf. To the underside of table 9 is secured a bracket 449 with a screw-threaded opening. 450 is a cylindrical metallic piece fitted with a shoulder in a corresponding cylindrically shouldered space cut out in table 9. The lower part of 450 is screw threaded to fit into the screw threaded opening in bracket 449. The shoulder of piece 450 is provided in its upper surface with cylindrical spanner holes 451. 452 is an extension of the top 3 of the machine provided with a cylindrical opening. 448 is a screw having a screw-threaded shank which fits into a central cylindrical socket in the upper part of 450 and which socket is also screw-threaded. This same fastening means is applied on each corner of the machine.

It will, of course, be understood that in using the terms "adding" or "subtracting" in this specification or the claims I intend to include the complement of these terms as a full equivalent. Thus, for example, instead of adding six points in any movement, the same result exactly would be obtained upon the adding mechanism by subtracting its complement, viz. by subtracting 4 and the above terms are used broadly to include such complement.

The term "card" as used herein is used broadly to indicate any proper record surface, no matter of what material it is made or what its shape. The time marks upon such a card are not necessarily restricted to holes punched therein, as any suitable marks capable of actuating subtractor devices are within their meaning. It will also of course, be understood that in the specification and claims the use of any language indicating the movement of one part toward or to another part would include the movement of the second toward or to the first as a full equivalent thereof so long as the same result is obtained.

Many modifications and changes, other than those herein indicated, may, of course, be made in the form of apparatus shown in the drawings without departing from my invention.

My improvement possesses many advantages, some of which have been already set forth in one place or another in this specification. It provides an elapsed time recording machine, simple in construction and easy in operation, in which the time-of-day is printed at each operation of the machine but in which the elapsed time is printed only at a second or "out" operation; one in which the record of elapsed time is not limited to a part of a day or days but which may extend over an indefinite period of time; also one in which the record of elapsed time will include only a record of the working time and will automatically exclude from the record all other times.

My improved device has relatively few parts and is strong and durable. It is peculiarly well adapted for recording elapsed times of jobs of considerable duration, although it is, of course, not limited to such uses. In it no cut-out mechanism for throwing the punching mechanism out of operative connection with the driving parts is necessary. By means of it the records can be all made upon one side of a card. By means of my improved device also any number of elapsed time indicating machines may be operated from a common source of power.

What I claim as new and desire to secure by Letters Patent is:—

1. In the time-controlled mechanism for operating elapsed time indicating devices the combination of a timing cam, a clock-controlled means for actuating it, a device, adapted to operate at pre-determined intervals, for disconnecting or connecting the clock-controlled means and the cam for pre-determined periods of time, whereby the cam may be alternately actuated or at rest for pre-determined periods of time, and means controlled by the cam for moving the elapsed time indicating mechanism to correspond with the position of the cam.

2. In an elapsed time indicating machine the combination of elapsed time indicating mechanism, a timing cam, a clock-controlled means for actuating it, a device, adapted to operate at pre-determined intervals, for disconnecting or connecting the clock-controlled means and the cam for pre-determined periods of time, whereby the cam may be alternately actuated or at rest for pre-determined periods of time, means controlled by the cam for moving the elapsed time indicating mechanism one way in accordance with the then position of the cam, and means, set by the cam at a prior operation of the machine in accordance with its then position, and adapted at the later operation to control the movement of the elapsed time indicating mechanism the reverse way to subtract therefrom the time of such prior operation, whereby the resultant of the two movements of the elapsed time indicating mechanism will give an indication of the elapsed time between the two operations.

3. In an elapsed time indicating machine the combination of elapsed time indicating mechanism, a timing cam, clock-controlled means for actuating it, a device, adapted to operate at predetermined intervals, for disconnecting or connecting the clock-controlled means and the cam for predetermined periods of time, whereby the cam may be alternately actuated or at rest for predetermined periods of time, a time device, connections between it and the cam for affecting the time device at one operation of the machine to correspond with the then position of the cam, means controlled by the cam at a later operation of the machine for moving the elapsed time indicating mechanism one way in accordance with the then position of the cam, and means, controlled by the time device in its affected position for controlling the movement of the elapsed time indicating mechanism the reverse way, whereby the resultant of the two movements of the elapsed time indicating mechanism will give an indication of the elapsed time between the two operations.

4. In the time-controlled mechanism for operating time indicating devices the combination of a series of timing cams of different denominations of time, clock-controlled means for actuating the cam of lowest denomination, a device, adapted to operate at pre-determined intervals, for disconnecting or connecting the clock-controlled means and the cam of lowest denomination for pre-determined periods of time, whereby the said cam may be alternately actuated or at rest for pre-determined periods of time, and means controlled by each cam at the completion of its full movement to cause the next higher cam to move one unit of its movement, whereby an indefinite expansion of the range of time indications given by the positions of the cams may be obtained.

5. In the time controlled mechanism for operating elapsed time indicating devices the combination of a series of timing cams of different denominations of time, clock-controlled means for actuating the cam of lowest denomination, a device, adapted to operate at pre-determined intervals, for disconnecting or connecting the clock-controlled means and the cam of lowest denomination for pre-determined periods of time, whereby the said cam may be alternately actuated or at rest for pre-determined periods of time, and means controlled by each cam at the completion of its full movement to add one to the next higher cam, whereby an indefinite expansion of the range of elapsed time indications given by the positions of the cams may be obtained.

6. In an elapsed time indicating machine the combination of elapsed time indicating mechanism, a series of timing cams of different denominations of time, clock controlled means for actuating the cam of lowest denomination, a device, adapted to operate at pre-determined intervals, for disconnecting or connecting the clock-controlled means and the cam of lowest denomination for pre-determined periods of time, whereby the cam may be alternately actuated or at rest for pre-determined periods, a time device, connections between it and the cams for affecting the time device at one operation of the machine to correspond with the then positions of the cams, means controlled by the cams at a later operation of the machine for moving the elapsed time indicating mechanism one way in accordance with the then positions of the cams, means controlled by the time device in its affected condition for moving the elapsed time indicating mechanism the reverse way, whereby the resultant of the two movements of the elapsed time indicating mechanism will give an indication of the elapsed time between the two operations, and means controlled by each timing cam at the completion of its full movement to cause the next higher cam to move one unit of its movement, whereby an indefinite expansion of the range of elapsed time indications given by the cams may be obtained.

7. In the time controlled mechanism for operating time indicating devices the combination of a timing cam, a clock-controlled means for actuating it, and a magnetically controlled device, adapted to operate at pre-determined intervals, for disconnecting or connecting the clock-controlled means and the cam for pre-determined periods of time, whereby the cam may be alternately actuated or at rest for pre-determined periods of time.

8. In an elapsed time indicating machine the combination of elapsed time indicating mechanism, a series of timing cams of different denominations of time, clock-controlled means for actuating the cam of lowest denomination, a magnetically-controlled device, adapted to operate at pre-determined intervals, for disconnecting or connecting the clock-controlled means and the cam of lowest denomination for pre-determined periods of time, whereby the cam may be alternately actuated or at rest for pre-determined periods, a time device, connections between it and the cams for setting it at one operation of the machine to correspond with the then positions of the cams, means controlled by the cams at a later operation of the machine for moving the elapsed time indicating mechanism one way in accordance with the then positions of the cams, means controlled by the time device in its affected conditions for moving the elapsed time indicating mechanism the reverse way, whereby the resultant of the two movements of the elapsed time indicating mechanism will give an indication of the elapsed time between the two operations, and means controlled by each timing cam at the completion of its full movement to cause the next higher cam to move one unit of its movement, whereby an indefinite expansion of the range of elapsed time indications given by the cams may be obtained.

9. In a time indicating machine the combination of a clock controlled time-of-day cam, time indicating mechanism adapted to be controlled by said cam to indicate time-of-day, a second time cam, clock-controlled means for actuating it, a device, adapted to operate at pre-determined intervals, for disconnecting or connecting the clock-controlled means and the second cam for pre-determined periods of time, whereby the cam may be alternately actuated or at rest for pre-determined periods, and time indicating mechanism adapted to be affected in its time indicating movement by said second cam.

10. In a time indicating machine the combination of a time-of-day cam, clock-controlled means for actuating it, time indicating mechanism adapted to be controlled by said cam to indicate the time-of-day, a second time cam, adapted also to be actuated by the clock-controlled means, a device, adapted to operate at pre-determined intervals, for disconnecting or connecting the clock-controlled means and the second cam for pre-determined periods of time, and time indicating mechanism adapted to be affected in its time indication by said second cam, whereby the first time indicating mechanism will always indicate time-of-day but the second time indicating mechanism will indicate the time corresponding with the position of the second time cam.

11. The combination of a time indicating mechanism, a timing cam, connections between the timing cam and the time indicating mechanism adapted to move the latter to correspond with the condition of the former, a clock controlled means for actuating the timing cam, and a clutch, adapted to operate at predetermined intervals for disconnecting or connecting the clock controlled means and the timing cam.

12. The combination of elapsed time indicating mechanism, a timing cam, connections controlled by the timing cam adapted to move the elapsed time indicating mechanism one way in accordance with the then position of the timing cam, a time device, means, controlled by the timing cam, for affecting the time device in accordance with the condition of the cam at the time, subtracting means controlled by the time device for moving the elapsed time indicating mechanism the reverse way, a clock controlled means for actuating the timing cam, and a clutch, adapted to operate at predetermined intervals, for disconnecting or connecting the clock-controlled means and the cam.

13. The combination of elapsed time indicating mechanism, a series of timing cams, clock-controlled means for actuating them, a device, adapted to operate at predetermined intervals, for disconnecting or connecting the clock-controlled means and the cams for predetermined periods of time, a time device, connections between each cam and the time device for affecting it to correspond with the condition of the cam, means controlled by each cam at a later operation of the machine for moving the elapsed time indicating mechanism one way to correspond with the then condition of the cams, and means controlled by the time device in its affected condition for controlling the movement of the elapsed time indicating mechanism the reverse way.

14. In the time-controlled mechanism of an elapsed time indicating machine the combination of two separate sets of timing cams, one set adapted to control the time-of-day indication and the other set adapted to affect the elapsed time indication of the machine, a time-of-day indicator and an elapsed time indicator each normally standing at zero and disconnected from its set of timing cams, and means for connecting each indicator with its set of timing cams to move the indicator to a position corresponding with the time then represented by the condition of its set of timing cams.

15. In the time-controlled mechanism of an elapsed time indicating machine the combination of time-of-day indicating mechanism, elapsed time indicating mechanism, and two separate sets of timing cams adapted to be connected with or disconnected from each indicating mechanism, one set adapted to control the time-of-day indicating mechanism when connected with it, and the other set adapted to affect the indication of the elapsed time indicating mechanism when connected with it.

16. In an elapsed time indicating machine the combination of time-of-day indicating mechanism of different denominations of time, means for carrying from each mechanism of lower order to the mechanism of next higher order, elapsed time indicating mechanisms of different denominations of time, means for carrying from each denomination of lower order to the next higher order, two separate sets of timing cams, one set for the time-of-day indicating mechanisms and the other set for the elapsed time indicating mechanisms and each set composed of a series of timing cams of different denominations of time, one for each corresponding indicating mechanism, and each set provided with means for carrying from a lower cam to the cam of next higher denomination, clock-controlled means for actuating the timing cam of lowest denomination of each set, connections between each cam of the first set and its corresponding time-of-day indicating mechanism adapted to move the latter to correspond to the position of its cam to indicate time-of-day, connections between each cam of the second set and its corresponding elapsed time indicating mechanism adapted at an operation of the machine to move said indicating mechanism one way to correspond with the then position of the cam, a device, adapted to operate at pre-determined intervals, for disconnecting or connecting the clock-controlled means and the lowest cam, connected with the elapsed time indicating mechanism, for pre-determined intervals of time, whereby the cam may be alternately actuated or at rest for pre-determined periods, a series of time setting devices, one for each cam of the second set, connections between each cam and its setting device adapted on a first operation of the machine to move such setting device in accordance with the then position of its cam, a card, adapted to have time marks placed upon it by the setting devices, the location of said marks on the card representing the time of said first operation, and means, adapted to be controlled in their movement by the said time marks on the card at a later operation of the machine, to move the elapsed time indicating mechanism the reverse way, whereby the machine will give a time-of-day indication at each of its operations, and at a second operation of the machine by any operator the machine will also give an elapsed time indication between the two operations by such operator and whereby such elapsed time indications may cover longer periods of time than a half day or a day.

17. In an elapsed time indicating machine the combination of two separate and independent sets of indicating mechanism, one for time-of-day and the other for elapsed time, two separate and independent sets of timing cams, one set for the time-of-day indicating mechanism and the other set for the elapsed time indicating mechanism, clock-controlled means for actuating the timing cams, a device, adapted to operate at pre-determined intervals, for disconnecting or connecting the clock-controlled means and the elapsed time set of timing cams, whereby a time-of-day indication will be given at each operation of the machine and whereby the indications represented by the progressive positions of the elapsed time cams from time to time will form a continuous and progressive series and will exclude the time of disconnection between the clock-controlled means and such cams.

18. In an elapsed time indicating machine the combination of two separate and independent sets of indicating mechanism, one for time-of-day and the other for elapsed time, each set composed of a series of indicating mechanism of different denominations of time and provided with means for carrying from each mechanism to the mechanism of next higher order, two separate and independent sets of timing cams, one set for the time-of-day indicating mechanism and the other set for the elapsed time indicating mechanism, each set composed of a series of cams of different denominations of time and provided with means for carrying from one cam to the next cam of higher denomination, clock-controlled means for actuating the timing cams, a device, adapted to operate at pre-determined intervals, for disconnecting or connecting the clock controlled means and the elapsed time set of timing cams, whereby a time-of-day indication will be given at each operation of the machine and whereby the indications represented by the progressive positions of the elapsed time cams from time to time will form a continuous and progressive series and will exclude the time of disconnection between the clock-controlled means and such cams.

19. In an elapsed time indicating machine the combination of two separate and independent sets of indicating mechanism, one for time-of-day and the other for elapsed time, two separate and independent sets of timing cams, one set for the time-of-day indicating mechanism and the other set for the elapsed time indicating mechanism, and clock-controlled means for actuating the timing cams.

20. The combination of time-of-day mechanism, elapsed time indicating mechanism, two separate sets of timing cams, one set adapted to control the time-of-day indicating mechanism, and the other set adapted to control the adding movement of the elapsed time indicating mechanism, a time device, adapted to have a time record made upon it by the elapsed time set of timing cams, and connections between the time device and the elapsed time indicating mechanism adapted to cause the former to control the subtracting movement of the latter.

21. In an elapsed time indicating machine the combination of a time storing or adding device adapted to add from day to day the time within some period or periods of the day and not to add the time within another or other periods of the day and to indicate by its condition at any time the total of such times added, a time device adapted to have a time record made upon it, means controlled by the adding device for making a time record upon the device in accordance with the condition of the adding device at the time, and means jointly controlled by the time device in its said condition and by the adding device in its condition at a later operation of the machine to indicate the elapsed time of the said included period or periods between the two operations of the machine.

22. In an elapsed time indicating machine the combination of a time storing or adding device adapted to add from day to day the time within some period or periods of the day and not to add the time within another or other periods of the day and to indicate by its condition at any time the total of such times added, a time device adapted to have a time record set upon it, means controlled by the adding device for setting a time record upon the time device in accordance with the condition of the adding device at the time of such setting, and means for subtracting at any later operation from the time represented by the then position of the adding device the time represented by the set condition of the identification device.

23. In the adding mechanism of an elapsed time indicating machine the combination of a series of time storing or adding devices of different denominations of time adapted to add from day to day the time within some period or periods of the day and not to add the time within a certain other period or periods of the day and to indicate by the condition of the adding devices at any time the total of such times added, automatic means for rendering such storing device operative to add during such first mentioned period or periods and inoperative to add during said other period or periods, and carrying means for carrying from each adding device to the adding device of next higher denomination.

24. In an elapsed time indicating machine the combination of time-of-day indicating mechanism, elapsed time indicating mechanism, timing cams, one for the time-of-day indicating mechanism and another for the elapsed time indicating mechanism, clock-controlled means for actuating the timing cams, connections between the time-of-day indicating mechanism and its cam adapted to move the former to correspond to the condition of the cam at any time to indicate the time-of-day, connections between the elapsed time indicating mechanism and its cam adapted to move the former one way to correspond with the then condition of the cam, a device, adapted to operate at pre-determined intervals, for disconnecting or connecting the clock-controlled means and the elapsed time timing cam for pre-determined intervals of time, a time setting device, a connection between the elapsed time timing cam and the setting device adapted on a first operation of the machine to move such device in accordance with the then condition of the cam, a card, adapted to have a time mark placed upon it by the setting device, the location of said mark on the card representing the time of said first operation, and means, adapted to be controlled in its movement by the said time mark on the card at a later operation of the machine, to move the elapsed time indicating mechanism the reverse way, whereby at each operation a time-of-day indication will be given, at a second operation by any operator an elapsed time indication between the two operations by said operator will be given and whereby such elapsed time indications may cover longer periods of time than a half day or day.

25. In an elapsed time indicating machine the combination of elapsed time indicating mechanism, a set of timing cams, clock-controlled means for actuating the timing cams, a device, adapted to operate at pre-determined intervals, for disconnecting or connecting the clock-controlled means and the elapsed time timing cams whereby the indications represented by the progressive positions of the elapsed time timing cams from time to time will form a continuous and progressive series and will exclude the time of disconnection between the clock-controlled means and such cams.

26. The combination of a series of timing cams of different denominations of time, clock-controlled means for actuating the timing cam of the lowest denomination, means for carrying from each timing cam to the timing cam of next higher denomination, and a clutch for operatively connecting or disconnecting the clock-controlled means and the timing cams at pre-determined intervals of time, whereby some periods of time will be added upon the timing cams and others will not.

27. The combination of a series of timing cams of different denominations of time, clock-controlled means for actuating the timing cam of the lowest denomination, means for carrying from each timing cam to the timing cam of next higher denomination, and a magnetic clutch for operatively connecting or disconnecting the clock-controlled means and the timing cams at pre-determined intervals of time, whereby some periods of time will be added upon the timing cams and others will not.

28. The combination of a time storing or adding device, clock-controlled means for actuating the adding device, a clutch for operatively connecting or disconnecting the clock-controlled means and the adding device, and magnetic means for operating the clutch, and a clock-driven contact piece adapted at pre-determined intervals of time to make or break contact to energize or de-energize the said magnetic means, whereby some periods of time will automatically be added upon the adding device and others will not.

29. The combination of a series of timing cams of different denominations of time, means for carrying from one cam to the cam of next higher order, clock-controlled means for actuating the cam of lowest denomination, a clutch for operatively connecting and disconnecting the clock-controlled means and the cam of lowest denomination, magnetic means for operating the clutch, and a clock-driven contact piece adapted at pre-determined intervals of time to make or break contacts to energize or de-energize the said magnetic means, whereby some periods of time will automatically be added upon the cams and others will not.

30. The combination of a time storing or adding device, clock-controlled means for actuating the adding device, a clutch for operatively connecting or disconnecting the clock-controlled means and the adding device, a magnet for operating the clutch, a circuit through the magnet, a clock-driven disk provided with a series of circuit opening and closing devices adapted to open and close said circuit at pre-determined intervals of time, whereby some periods of time will automatically be added upon the adding device and others will not.

31. The combination of a time storing or adding device, clock-controlled means for actuating the adding device, a clutch for operatively connecting or disconnecting the clock-controlled means and the adding device, a magnet for operating the clutch, a circuit through the magnet, a circuit maker and breaker in said circuit, a clock-driven disk provided with a series of contacts arranged circumferentially thereon, said contacts being so arranged on the disk as to contact with said circuit maker and breaker at predetermined intervals of time and cause it to make or break the circuit through said magnet, whereby some periods of time will automatically be added upon the adding device and others will not.

32. The combination of time indicating mechanism, a clock movement for controlling its intermittent operation at regular beats of time, a time storing or adding device, connections between the latter and the clock movement for controlling its adding operation, a clutch in said connections for cutting the adding device out or into operative connection, and means for operating the clutch adapted to be actuated by the clock movement between the beats of time when it exercises control over the operation of the time indicating mechanism, whereby the cutting in or out of the adding device will not interfere with the regular operation of the parts.

33. The combination of a clock movement, a set of time-of-day timing cams of different denominations of time, carrying devices for carrying from one cam to the next higher cam, a set of elapsed time timing cams of different denominations of time, carrying devices for carrying from each cam to the next higher cam, a magnet for operating the cam of lowest denomination of both sets, a circuit through said magnet, a circuit maker and breaker therein operated by the clock movement at regular beats of time, a clutch in the connections between the magnet and the lowest elapsed time timing cam, a magnet for throwing such clutch into or out of operative connection, a circuit through said magnet containing two circuit controllers, one circuit controller adapted to be closed by the clock between the regular beats and the other circuit controller adapted to be closed at certain pre-determined intervals of time, whereby on the closing of both circuit controllers the elapsed time timing cams will be driven and whereby the cutting in or out of the elapsed time timing cams will not interfere with the operation of the parts.

34. The combination of two separate sets of timing cams, one set for time-of-day and the other for elapsed time, clock-controlled means for driving them, adapted to drive the time-of-day set of cams continuously and the other set only at certain times, and a time controlled magnetic cut-out adapted at pre-determined intervals to operatively connect or disconnect the elapsed time timing cams and the clock-controlled driving means.

35. The combination of two separate sets of timing cams, one set for time-of-day and the other for elapsed time, clock-controlled means for driving them, in a step by step movement at regular beats of time, adapted to drive the time-of-day set of cams continuously and the other set only at certain times, and a time controlled magnetic cut-out adapted at pre-determined intervals between one step drive and another step drive of the clock-controlled driving means to operatively connect or disconnect the elapsed time timing cams and the clock-controlled driving means.

36. The combination of time indicating mechanism, driving means, a magnet for operating the latter, a main operating circuit through said magnet, clock-controlled means for making and breaking said circuit at regular stated intervals, a clutch connected with said driving means for operatively connecting or disconnecting the magnet and the time indicating mechanism, a magnet for actuating the clutch, a circuit through said magnet, and clock-controlled means for controlling said circuit and adapted to be actuated at pre-determined intervals of time, whereby the time indicating mechanism will be driven by the operating magnet but only at certain pre-determined times.

37. The combination of time indicating mechanism, driving means, a magnet for operating the latter, a main operating circuit through said magnet, clock-controlled means for making and breaking said circuit at regular stated intervals, a clutch connected with said driving means for operatively connecting or disconnecting the magnet and the time indicating mechanism, a magnet for actuating the clutch, a circuit through said magnet, a circuit controller therein adapted to be intermittently actuated by the clock-controlled means between its regular make and break actuations of the main operating circuit, and another circuit controller in series with the first circuit controller in said circuit and adapted to be actuated by the clock-movement at pre-determined intervals of time, whereby the time indicating mechanism will be driven by the operating magnet but only at certain pre-determined times and the actuation of the clutch will not take place during the operation of the indicating mechanism by the operating magnet.

38. The combination of a series of separate time indicating mechanisms, driving means for each indicating mechanism, an operating magnet for each driving means, a common source of electric power, a circuit therefrom through each operating magnet, clock-controlled means for making and breaking said operating circuit at regular stated intervals, a clutch in each driving means for operatively connecting and disconnecting its magnet and time indicating mechanism, an actuating magnet for each clutch, a circuit through said clutch magnet, and clock-controlled means for controlling said clutch circuits adapted to be actuated at pre-determined intervals of time, whereby a series of time indicating mechanisms may be driven from the common source of power and for certain pre-determined periods of time.

39. In a time recording machine the combination of a printing device, operating means for it, a clutch connected therewith normally out of operative position, a card provided with a detent, a detector finger adapted in one position of the card to pass through the detent, and connections between the detector finger and the printing device adapted, when the detector finger passes through the detent, to move the clutch to operative position to actuate the printing device.

40. In a time recording machine the combination of a printing device, operating means for it, a clutch connected therewith normally out of operative position, a card provided with a detent and adapted to be shifted to either one of two positions, a detector finger adapted in one position of the card to pass through the detent, and connections between the detector finger and the printing device adapted, when the detector finger passes through the detent, to move the clutch to operative position to actuate the printing device.

41. In a time recording machine the combination of a printing device, operating means for it, a clutch connected therewith normally out of operative position, a card provided with a detent, two card slots, a detector finger adapted to strike the card when the latter is in one slot and to pass through the detent of the card when in the second slot, and connections between the detector finger and the printing device adapted, when the detector finger passes through the detent, to move the clutch to operative position to actuate the printing device.

42. In an elapsed time recording machine the combination of time-of-day type-wheels, elapsed time type-wheels, a separate printing hammer for each, common operating means for both hammers, a clutch in the connections between the said operating means and the hammer for the elapsed time type-wheels normally out of operative position, a detector finger, a card provided with a detent and adapted in an "out" operation of the machine to occupy slightly different sidewise position relatively to the detector finger than the one it occupies in an "in" operation so as to permit the finger to pass through the detent on the "out" operation but preventing it from so doing on an "in" operation, and connections between the detector finger and the elapsed time printing hammer adapted, when the detector finger passes through the detent, to move the clutch to operative position to actuate the printing device, whereby the time-of-day indication will be printed upon the card at each operation of the machine but elapsed time will be printed upon it only at an "out" operation of the machine.

43. The combination of a time storing device, a time indicator normally disconnected from the storing device but adapted to be brought into connection with it and, when thus connected, adapted to indicate the time represented by the then condition of the time storing device, clock controlled means for operating the time storing device to cause it to add time, and a device, adapted to operate at pre-determined intervals, for disconnecting or connecting the clock controlled means and the storing device, whereby the latter may be alternately actuated or at rest for pre-determined periods of time.

44. The combination of a time indicator, a time storing device, means for connecting at will the former with the latter to cause the former to indicate the time represented by the then condition of the latter, clock controlled means for actuating the time storing device, and a clutch, adapted to operate at pre-determined intervals, for disconnecting or connecting the clock controlled means and the time storing device.

45. In an elapsed time indicating machine the combination of a card, two card slots overlapping each other, one for the card on an "in" operation of the machine, and the other for the "out", time controlled punching devices so arranged relatively to the slots as to be in register with the card on an "in" operation and to be out of register with the card on an "out" operation, and means for operating the punching devices at each operation of the machine, whereby time holes representing the time of the first operation will be punched in the card at such "in" operation and no punching in the card will take place on the "out" operation.

46. In an elapsed time indicating machine the combination of a card, two card slots overlapping each other, one for the card on an "in" operation of the machine, and the other for the "out", time controlled punching devices so arranged relatively to the slots as to be in register with the card on an "in" operation and to be out of register with the card on an "out" operation, means for operating the punching devices at each operation of the machine, elapsed time type-wheels, means for moving them one way in accordance with the time of an "out" operation, subtracting means for moving them the reverse way so arranged relatively to the slots as in the "out" position of the card to be in register with the holes previously punched in the card, whereby time holes representing the time of the first operation will be punched in the card at such "in" operation and no punching in the card will take place on the "out" operation, and whereby on an "out" operation the subtracting means will be controlled in their subtracting movement by the holes in the card and whereby the card will always face one way in the card slots and all the records be printed upon one side of the card.

47. In the mechanism of an elapsed time indicating machine adapted to make a preliminary record on a card representing the time of a first or "in" operation the combination of a series of timing cams of different denominations of time, a series of punch selectors, one for each timing cam, and connections from each cam to its selector for operating the latter including a double cross-over, whereby the selectors can be arranged in position in the same order as the timing cams.

48. In the mechanism of an elapsed time indicating machine adapted to make a preliminary record on a card representing the time of a first or "in" operation the combination of a series of timing cams of different denominations of time, a series of elapsed time type-wheels of different denominations, one for each cam, said elapsed time type-wheels arranged in position in the same order as the timing cams, a series of punch selectors, one for each timing cam, and connections from each cam to its selector for operating the latter including a double cross-over, whereby the selectors can be arranged in position in the same order as the timing cams and elapsed time type-wheels and whereby the card may face the same way in all operations of the machine.

49. The combination of a storing or adding device adapted to add from day to day the time within some period or periods of the day and not to add the time within another or other periods of the day and time indicating mechanism normally at zero and normally disconnected from the storing device but adapted to be connected with the storing device, and, when thus connected, to indicate the time represented by the then condition of the storing device.

50. In an elapsed time recording machine the combination of time-of-day type-wheels, elapsed time type-wheels, a separate printing hammer for each of said sets of type-wheels, common operating means for both hammers, a clutch in the connections between the said operating means and the hammer for the elapsed time type-wheels normally out of operative position, a detector finger, two card slots in the machine, one for the "in" operation and the other for the "out" operation of the machine, a card provided with a detent, the detector finger and card slots and detent being arranged so as to permit the finger to pass through the detent when the card is in the "out" slot but preventing it from so doing when the card is in the "in" slot, and connections between the detector finger and the elapsed time printing hammer adapted, when the detector finger passes through the detent in the card, to move the clutch to operative position to actuate the elapsed time printing hammer, whereby the time-of-day indication will be printed upon the card at each operation of the machine but elapsed time will be printed upon it only at an "out" operation of the machine.

In testimony whereof, I have signed my name to this specification, in the presence of two subscribing witnesses.

JAMES W. BRYCE.

Witnesses:
N. H. HEYL,
S. H. S. HEYL.

Copies of this patent may be obtained for five cents each, by addressing the "Commissioner of Patents. Washington, D. C."